US011137350B2

United States Patent
Wang et al.

(10) Patent No.: US 11,137,350 B2
(45) Date of Patent: Oct. 5, 2021

(54) MID-INFRARED SPECTROSCOPY FOR MEASUREMENT OF HIGH ASPECT RATIO STRUCTURES

(71) Applicant: KLA Corporation, Milpitas, CA (US)

(72) Inventors: David Y. Wang, Santa Clara, CA (US); Shankar Krishnan, Santa Clara, CA (US); Guorong V. Zhuang, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 88 days.

(21) Appl. No.: 16/741,734

(22) Filed: Jan. 13, 2020

(65) Prior Publication Data

US 2020/0240907 A1 Jul. 30, 2020

Related U.S. Application Data

(60) Provisional application No. 62/797,668, filed on Jan. 28, 2019.

(51) Int. Cl.
*G01N 21/35* (2014.01)
*G01N 21/47* (2006.01)
(Continued)

(52) U.S. Cl.
CPC ..... *G01N 21/3563* (2013.01); *G01N 21/4788* (2013.01); *G01N 2021/335* (2013.01); *G01N 2021/4792* (2013.01)

(58) Field of Classification Search
CPC ............ G01B 11/0633; G01B 2210/56; G01N 21/3563; G01N 21/4788; G01N 2021/335; G01N 2021/4792
See application file for complete search history.

(56) References Cited

U.S. PATENT DOCUMENTS 5,166,752 A 11/1992 Spanier et al.
5,608,526 A 3/1997 Piwonka-Corle et al.
(Continued)

FOREIGN PATENT DOCUMENTS

WO 2018128995 A1 7/2018

OTHER PUBLICATIONS

Gostein et al., "Measuring deep-trench structures with model-based IR," Solid State Technology, vol. 49, No. 3, pp. 38-42, Mar. 1, 2006.
(Continued)

*Primary Examiner* — Mark R Gaworecki
(74) *Attorney, Agent, or Firm* — Spano Law Group; Joseph S. Spano

(57) ABSTRACT

Methods and systems for performing high throughput spectroscopic measurements of semiconductor structures at mid-infrared wavelengths are presented herein. A Fourier Transform Infrared (FTIR) spectrometer includes one or more measurement channels spanning a wavelength range between 2.5 micrometers and 12 micrometers. The FTIR spectrometer measures a target at multiple different angles of incidence, azimuth angles, different wavelength ranges, different polarization states, or any combination thereof. In some embodiments, illumination light is provided by a laser sustained plasma (LSP) light source to achieve high brightness and small illumination spot size. In some embodiments, FTIR measurements are performed off-axis from the direction normal to the surface of the wafer. In some embodiments, a Stirling cooler extracts heat from the detector of an FTIR spectrometer. In another aspect, measurements performed by one or more spectrometer measurement channels are combined with measurements performed by a mid-infrared FTIR spectrometer channel to characterize high aspect ratio structures.

37 Claims, 10 Drawing Sheets

(51) Int. Cl.
*G01N 21/3563* (2014.01)
*G01N 21/33* (2006.01)

(56) References Cited

U.S. PATENT DOCUMENTS

| | | | |
|---|---|---|---|
| 5,808,738 | A | 9/1998 | Garcia-Rubio |
| 5,859,424 | A | 1/1999 | Norton et al. |
| 5,943,122 | A | 8/1999 | Holmes |
| 6,429,943 | B1 | 8/2002 | Opsal et al. |
| 6,633,831 | B2 | 10/2003 | Nikoonahad et al. |
| 6,734,967 | B1 | 5/2004 | Piwonka-Corle et al. |
| 6,816,570 | B2 | 10/2004 | Janik et al. |
| 6,859,278 | B1 | 2/2005 | Johs et al. |
| 6,895,075 | B2 | 5/2005 | Yokhin et al. |
| 6,972,852 | B2 | 12/2005 | Opsal et al. |
| 7,043,288 | B2 | 5/2006 | Davis, III et al. |
| 7,478,019 | B2 | 1/2009 | Zangooie et al. |
| 7,755,764 | B2 | 7/2010 | Kwak et al. |
| 7,826,071 | B2 | 11/2010 | Shchegrov et al. |
| 7,907,264 | B1 | 3/2011 | Krishnan |
| 7,929,667 | B1 | 4/2011 | Zhuang et al. |
| 7,933,026 | B2 | 4/2011 | Opsal et al. |
| 8,860,937 | B1 | 10/2014 | Dziura et al. |
| 9,291,554 | B2 | 3/2016 | Kuznetsov et al. |
| 9,310,290 | B2 | 4/2016 | Wang et al. |
| 9,915,522 | B1 | 3/2018 | Jiang et al. |
| 9,921,104 | B2 | 3/2018 | Krishnan et al. |
| 9,921,152 | B2 | 3/2018 | Krishnan et al. |
| 2003/0103209 | A1 | 6/2003 | Simon |
| 2008/0049214 | A1 | 2/2008 | Maznev et al. |
| 2012/0250032 | A1 | 10/2012 | Wilde et al. |
| 2013/0114085 | A1 | 5/2013 | Wang et al. |
| 2014/0111791 | A1 | 4/2014 | Manassen et al. |
| 2014/0172394 | A1 | 6/2014 | Kuznetsov et al. |
| 2014/0222380 | A1 | 8/2014 | Kuznetsov et al. |
| 2014/0297211 | A1 | 10/2014 | Pandev et al. |
| 2014/0316730 | A1 | 10/2014 | Shohegrov et al. |
| 2014/0375983 | A1 | 12/2014 | Wolf et al. |
| 2015/0042984 | A1 | 2/2015 | Pandev et al. |
| 2015/0046118 | A1 | 2/2015 | Pandev et al. |
| 2015/0193926 | A1 | 7/2015 | Berlatzky et al. |
| 2015/0204664 | A1 | 7/2015 | Bringoltz et al. |
| 2016/0139032 | A1 | 5/2016 | Rampoldi et al. |
| 2016/0161245 | A1 | 6/2016 | Fu et al. |
| 2016/0216197 | A1 | 7/2016 | Bringoltz et al. |
| 2018/0088040 | A1 | 3/2018 | Krishnan et al. |

OTHER PUBLICATIONS

International Search Report dated May 13, 2020, for PCT Application No. PCT/US2020/014677, filed on Jan. 23, 2020 by KLA Corporation, 4 pages.

| | PREDICTED 3-SIGMA MEASUREMENT PRECISION [ANGSTROMS] | | |
|---|---|---|---|
| | ILLUMINATION WAVELENGTHS | a-CARBON FILM 15,000 ANGSTROM THICKNESS | a-CARBON FILM 20,000 ANGSTROM THICKNESS |
| SE | 950-2200 NM | 74 (0.5%) | 500 (2.5%) |
| SE | 950-2500 NM | 65 (0.45%) | 450 (2.25%) |
| SR | 950-2200 NM | 27 (0.2%) | 149.4 (0.75%) |
| SR | 950-2500 NM | 18 (0.15%) | 72 (0.35%) |
FIG. 3
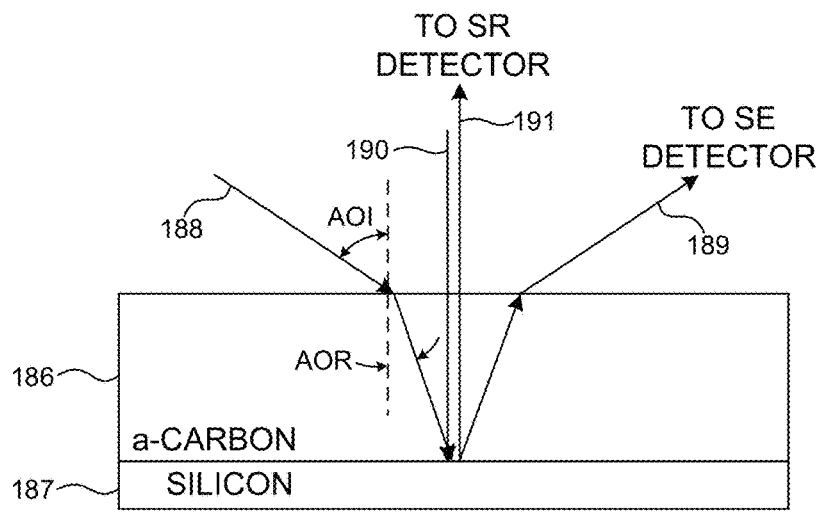
FIG. 4
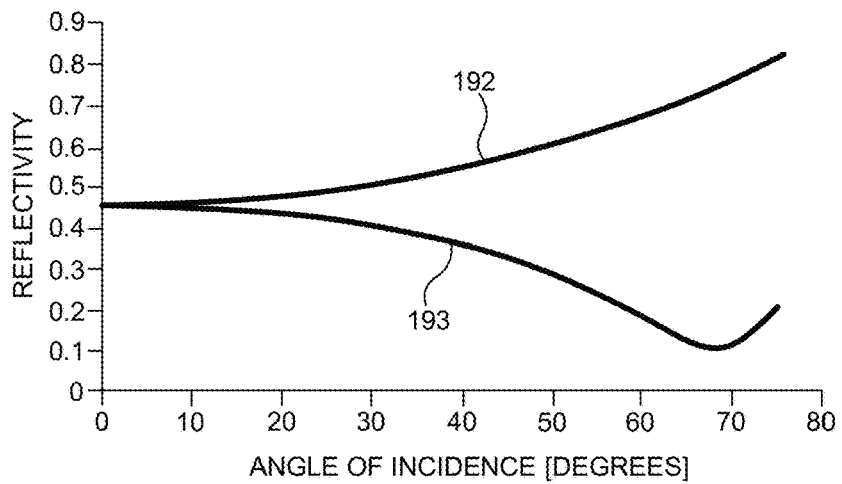
FIG. 5

MID-INFRARED SPECTROSCOPY FOR MEASUREMENT OF HIGH ASPECT RATIO STRUCTURES

CROSS REFERENCE TO RELATED APPLICATION

The present application for patent claims priority under 35 U.S.C. § 119 from U.S. provisional patent application Ser. No. 62/797,668, filed Jan. 28, 2019, the subject matter of which is incorporated herein by reference in its entirety.

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical metrology techniques offer the potential for high throughput without the risk of sample destruction. A number of optical metrology based techniques including scatterometry and reflectometry implementations and associated analysis algorithms are commonly used to characterize critical dimensions, film thicknesses, composition, overlay and other parameters of nanoscale structures.

Flash memory architectures are transitioning from two dimensional floating-gate architectures to fully three dimensional geometries. In some examples, film stacks and etched structures are very deep (e.g., up to six micrometers in depth). Such high aspect ratio structures create challenges for film and CD measurements. The ability to measure the critical dimensions that define the shapes of holes and trenches of these structures is critical to achieve desired performance levels and device yield.

Many optical techniques suffer from low signal-to-noise ratios (SNRs), as only a small fraction of the illumination light is able to reach the bottom of high aspect ratio features, and reflect upwards to the detector. Thus, many available high-throughput metrology techniques are unable to reliably perform CD and film measurements of high aspect ratio structures. Critical dimension, small angle X-ray scatterometry (CD-SAXS), normal incidence reflectometry, and scatterometry are being explored as measurement solutions for high aspect ratio structures, but development is still ongoing.

Cross-sectional scanning electron microscopy (SEM) is a low throughput, destructive technique that is not suitable for inline metrology. Atomic force microscopy (AFM) is limited in its ability to measure high aspect ratio structures and has relatively low throughput. CD-SAXS has not yet been demonstrated to achieve high throughput capabilities required by the semiconductor industry. Model based infrared reflectometry (MBIR) has been used for metrology of high aspect ratio DRAM structures, but the technique lacks the resolution provided by shorter wavelengths and the measurement spot sizes are too large for semiconductor metrology. Additional description of MBIR is provided in "Measuring deep-trench structures with model-based IR," by Gostein et al., Solid State Technology, vol. 49, no. 3, Mar. 1, 2006, which is incorporated by reference in its entirety.

Optical CD metrology currently lacks the ability to measure the detailed profile of structures with micron scale depths and lateral dimensions in a relatively small spot (e.g., less than 50 microns, or even more preferably, less than 30 microns) at high throughput. U.S. Pat. No. 8,860,937, which is incorporated by reference as if fully set forth herein, describes infrared spectroscopic ellipsometry techniques that are suitable for characterization of high aspect ratio structures. However, the described techniques suffer from long measurement times for measurements spanning the ultraviolet and infrared wavelengths, wavelength stability limitations, and limited range of infrared wavelengths during operation.

In summary, ongoing reductions in feature size and increasing depths of structural features impose difficult requirements on optical metrology systems. Optical metrology systems must meet high precision and accuracy requirements for increasingly complex targets at high throughput to remain cost effective. In this context, speed of broadband illumination and data collection and range of infrared wavelengths have emerged as critical, performance limiting issues in the design of optical metrology systems suitable for high aspect ratio structures. Thus, improved metrology systems and methods to overcome these limitations are desired.

SUMMARY

Methods and systems for performing high throughput spectroscopic measurements of semiconductor structures at mid-infrared wavelengths are presented herein. The methods and systems for spectroscopic metrology of semiconductor devices described herein are applied to the measurement of high aspect ratio (HAR) structures, large lateral dimension structures, or both. The described embodiments enable optical critical dimension (CD), film, and composition metrology for semiconductor devices.

In one aspect, a semiconductor metrology system includes a Fourier Transform Infrared (FTIR) spectrometer suitable for high throughput measurements of high aspect ratio semiconductor structures. In some embodiments, an FTIR spectrometer includes one or more measurement channels spanning a wavelength range between 2 micrometers and 20 micrometers. The one or more FTIR measurement channels are operable in parallel (i.e., simultaneous measurement of the sample throughout the wavelength range) or in sequence (i.e., sequential measurement of the sample throughout the wavelength range).

In a further aspect, an FTIR spectrometer measures a target at multiple different angles of incidence, azimuth angles, different wavelength ranges, different polarization states, or any combination thereof.

In a further aspect, an FTIR metrology system includes a laser sustained plasma (LSP) illumination source to achieve high brightness and small illumination spot size.

In another further aspect, the FTIR spectroscopic measurements are performed off-axis from the direction normal to the surface of the wafer to reduce the influence of backside reflections on the measurement results.

In another further aspect, an FTIR metrology system includes a diffractive polarizer and analyzer to measure target response as a function of polarization states.

In another further aspect, an FTIR spectrometer includes a Stirling cooled sensor to mitigate the need for external liquid nitrogen supply and handling equipment.

In another further aspect, measurements performed by one or more spectrometer measurement channels are combined with measurements performed by a mid-infrared FTIR spectrometer channel to characterize high aspect ratio structures. In some embodiments, measured spectra include vacuum ultraviolet, ultraviolet, visible, near infrared and mid-infrared wavelengths. In some of these embodiments, measurements of a semiconductor structure by multiple spectrometer measurement channels are performed simultaneously at high throughput with the same alignment conditions. In this manner, machine errors, such as wavelength errors, are uniformly corrected across all measured wavelengths. These features, individually, or in combination, enable high throughput measurements of high aspect ratio structures (e.g., structures having depths of one micrometer or more) with high throughput, precision, and accuracy. In other embodiments, a mid-infrared FTIR spectrometer and one or more additional measurement channels measure a target sequentially. In general, a mid-infrared FTIR spectrometer operating in combination with one or more additional measurement subsystems may measure a target at multiple different angles of incidence, azimuth angles, different wavelength ranges, different polarization states, or any combination thereof.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 3 depicts a chart 185 illustrating simulation results predicting expected 3-sigma measurement precision in various measurement scenarios.

FIG. 4 depicts an amorphous carbon layer 186 disposed on top of a silicon substrate 187 under measurement by an ellipsometer and a reflectometer.

FIG. 5 depicts the reflectivity of s-polarized illumination light versus the p-polarized illumination light as a function of angle of incidence.

DETAILED DESCRIPTION

Figure 1:
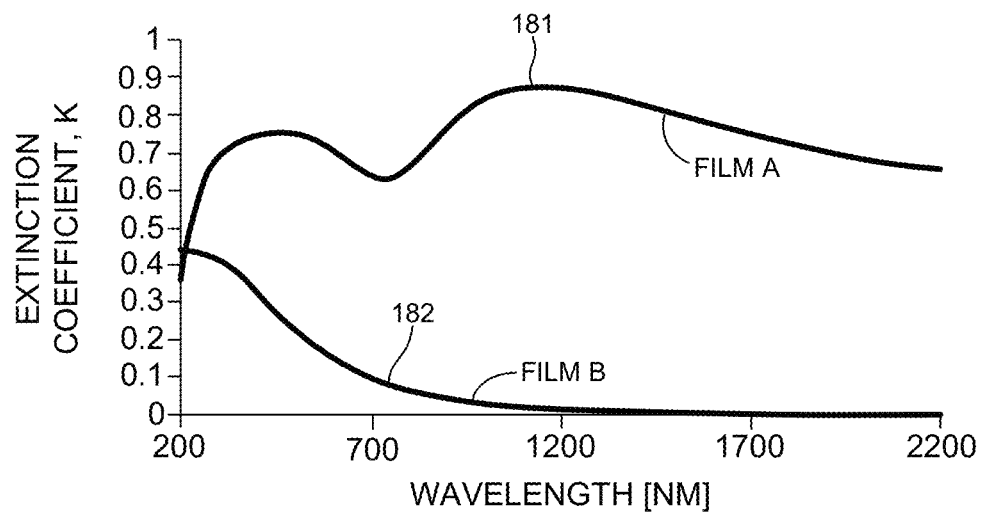
FIG. 1 depicts a plot of the extinction coefficient of two amorphous carbon films used as hardmask materials in etch steps of the semiconductor fabrication process.

Reference will now be made in detail to background examples and some embodiments of the invention, examples of which are illustrated in the accompanying drawings.

Methods and systems for performing high throughput spectroscopic measurements of semiconductor structures at mid-infrared wavelengths are presented herein. In one aspect, a semiconductor metrology system includes a Fourier Transform Infrared (FTIR) spectrometer suitable for high throughput measurements of high aspect ratio semiconductor structures. In some embodiments, an FTIR spectrometer including one or more measurement channels spanning a wavelength range between 2 micrometers and 20 micrometers is employed to perform measurements of semiconductor structures. The one or more FTIR measurement channels are operable in parallel (i.e., simultaneous measurement of the sample throughout the wavelength range) or in sequence (i.e., sequential measurement of the sample throughout the wavelength range).

In a further aspect, the FTIR spectroscopic measurements are performed off-axis from the direction normal to the surface of the wafer to reduce the influence of backside reflections on the measurement results. In another further aspect, an FTIR metrology system includes a laser sustained plasma (LSP) illumination source to achieve high brightness and small illumination spot size. In another further aspect, an FTIR metrology system includes a diffractive polarizer and analyzer to measure target response as a function of polarization states. In another further aspect, an FTIR spectrometer includes a Stirling cooled sensor to mitigate the need for external liquid nitrogen supply and handling equipment. In another further aspect, measurements performed by one or more spectrometer measurement channels are combined with measurements performed by a mid-infrared FTIR spectrometer channel to characterize high aspect ratio structures. In some embodiments, measured spectra include ultraviolet, visible, near infrared and mid-infrared wavelengths. In some of these embodiments, measurements of a semiconductor structure by multiple spectrometer measurement channels are performed simultaneously at high throughput with the same alignment conditions. In this manner, machine errors, such as wavelength errors, are uniformly corrected across all measured wavelengths. These features, individually, or in combination, enable high throughput measurements of high aspect ratio structures (e.g., structures having depths of one micrometer or more) with high throughput, precision, and accuracy.

By measuring a high aspect ratio structure with multiple spectrometer measurement channels of a single metrology system spanning a broad range of illumination wavelengths (e.g., 190 nanometers to 20 micrometers), precise characterization of complex three dimensional structures is enabled. In general, relatively long wavelengths penetrate deep into a structure and provide suppression of high diffraction orders when measuring structures with relatively large pitch. Relatively short wavelengths provide precise dimensional information about structures accessible to relatively short wavelengths (i.e., top level layers) as well as relatively small CD and roughness features. In some examples, longer wavelengths enable measurement of dimensional characteristics of targets with relatively rough surfaces or interfaces due to lower sensitivity of longer wavelengths to roughness.

In some embodiments, the methods and systems for spectroscopic metrology of semiconductor devices described herein are applied to the measurement of high aspect ratio (HAR), large lateral dimension structures, or both. These embodiments enable optical critical dimension (CD), film, and composition metrology for semiconductor devices with HAR structures (e.g., NAND, VNAND, TCAT, DRAM, etc.) and, more generally, for complex devices that suffer from low light penetration into the structure(s) being measured. HAR structures often include hard mask layers to facilitate etch processes for HARs. As described herein, the term "HAR structure" refers to any structure characterized by an aspect ratio that exceeds 2:1 or 10:1, and may be as high as 100:1, or higher.

More specifically, a semiconductor metrology system including a mid-infrared FTIR spectrometry based measurement channel enables high throughput characterization of several classes of semiconductor structures that are currently inadequately measured. Measurements include: 1) Measurement of critical dimensions of three dimensional semiconductor packages; 2) Measurement of epitaxial film layers with FTIR; 3) Measurement of high aspect ratio structures employed in DRAM manufacturing, in particular, the storage node; 4) Measurement of thick, opaque layers such as amorphous carbon films, and 5) Measurement of channel holes, tungsten recess, and other critical metrology challenges in three dimensional NAND manufacturing.

In addition, a semiconductor metrology system including a mid-infrared FTIR spectrometry based measurement channel and at least one spectroscopic reflectometry channel operating in a shorter wavelength range enables high throughput characterization of several emerging classes of semiconductor structures that are currently inadequately measured. These measurements include 1) Measurement of critical dimensions and shape of through silicon vias; 2) Measurement of critical dimensions and shape of DRAM capacitor structures; 3) Measurement of silicon/silicon carbide epitaxy and composition; 4) Measurement of films employed in three dimensional NAND hard mask layers (e.g., amorphous carbon layers); and 5) Measurement of three dimensional NAND Tungsten Recess and Channel hole profiles.

FIG. 1 depicts a plot of the extinction coefficient of two amorphous carbon films that are used as hardmask materials in etch steps of the fabrication process for three dimensional NAND structures. Plotline 181 depicts the extinction coefficient as a function of wavelength for an amorphous carbon film A, and plotline 182 depicts the extinction coefficient as a function of wavelength for an amorphous carbon film B. The extinction coefficient of film A maintains a relatively high value throughout the wavelength range from 200 nanometers to 2200 nanometers. Thus, film A is strongly absorbing even through the near IR spectral regions.

Figure 2:
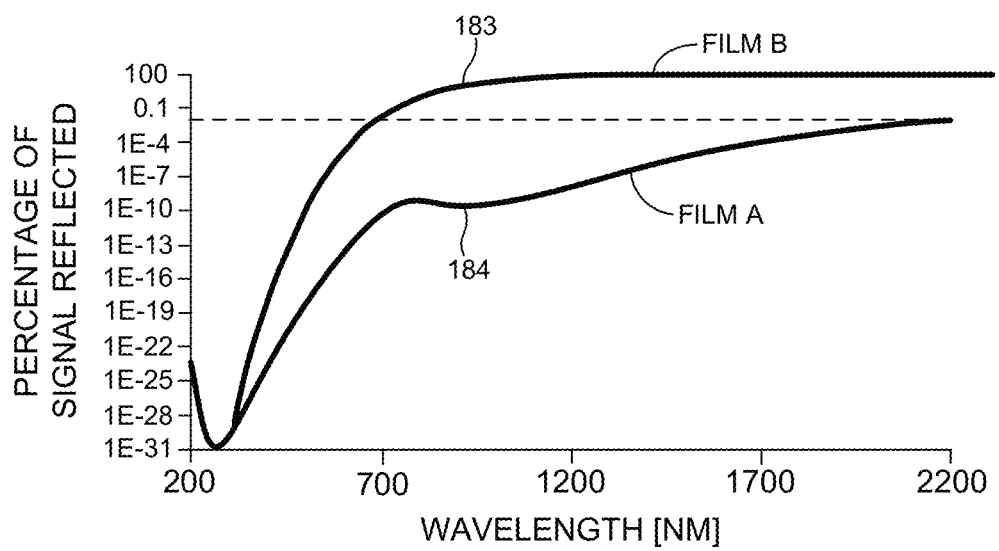
FIG. 2 depicts a plot of the percentage of light reflected from the two amorphous carbon films illustrated in FIG. 1.

FIG. 2 depicts plotline 184 of the percentage of light reflected from film A and plotline 183 of the percentage of light reflected from film B, having a thickness of 12,500 Angstroms as measured by a reflectometer. The percentage of light reflected from film A remains extremely low throughout the range of wavelengths from 200 nanometers to 2200 nanometers. As illustrated in FIG. 2, the minimum wavelength required to collect approximately 0.05% of incident light is approximately 2000 nanometers. Below approximately 1800 nanometers the amount of collected signal is practically immeasurable.

FIGS. 1 and 2 illustrate the importance of employing short-infrared light (e.g., 1400 nanometer to 3000 nanometer) and mid-infrared light (e.g., 3000 nanometer through 20 micrometers) to perform spectroscopic measurements of important materials employed in semiconductor manufacture.

In addition, reflectometer and ellipsometer configurations demonstrate different effectivity when measuring high extinction ratio materials. FIG. 3 depicts a chart 185 illustrating simulation results predicting the 3-sigma measurement precision expected in various measurement scenarios. Film thickness measurements of an amorphous carbon layer at two different thicknesses (15,000 Angstroms and 20,000 Angstroms) are simulated, both in a spectroscopic reflectometer configuration and a spectroscopic ellipsometer configuration. In addition, two different ranges of illumination wavelengths are considered. In one scenario SE and SR measurements are simulated with illumination wavelengths ranging from 950 nanometers to 2200 nanometers. In another scenario, SE and SR measurements are simulated with illumination wavelengths ranging from 950 nanometers to 2500 nanometers. As illustrated in FIG. 3, the SR configuration achieves significantly greater measurement precision compared to the SE measurements. In addition, measurements performed at the extended range of illumination wavelengths also achieve greater measurement precision.

Because the reflectometer operates at or near normal incidence, it has a "path length" advantage over an ellipsometer when performing measurements of thick or deep structures. FIG. 4 depicts an amorphous carbon layer 186 disposed on top of a silicon substrate 187. In an ellipsometer configuration, illumination light 188 is incident to film 186 at a relatively large angle (e.g., angle of incidence greater than 40 degrees). The light refracts at the air-film interface and propagates through film 186 at an angle of refraction that is significantly greater than zero. Similarly, light reflected from the bottom surface of film 186 propagates through film 186 at the angle of refraction, refracts at the air-film interface and propagates to a detector of the SE system. In contrast, in a reflectometer configuration, illumination light 190 is incident to film 186 at a relatively small angle (e.g., zero angle for the case of normal incidence reflectometry). At normal incidence, the light propagates through film 186 and reflects back from the bottom surface of film 186. The reflected light 191 propagates to the SR detector. As depicted in FIG. 4, the optical path length of the illumination light and the reflected light through film 186 is longer in an SE configuration than an SR configuration. This additional optical path length in film 186 leads to additional absorption and loss of measurement signal. For this reason, a relatively small angle SR configuration is preferable to a relatively large angle SE configuration for measurements of thick, highly absorptive materials such as amorphous carbon layers.

FIG. 5 depicts the reflectivity of s-polarized illumination light versus the p-polarized illumination light as a function of angle of incidence. Plotline 192 depicts the reflectivity of s-polarized light and plotline 193 depicts the reflectivity of p-polarized light. As illustrated in FIG. 5, the selected polarization impacts measurement sensitivity. Also, as illustrated in FIG. 5, the reflectivity of p-polarized light declines significantly in the typical angular range employed in SE measurements (e.g., AOI greater than 40 degrees). The decline is particularly acute near the Brewster angle. As illustrated in FIG. 5, to avoid significant declines in reflectivity of p-polarized light, a small angle reflectometry configuration (e.g., AOI less than 40 degrees) is preferable.

Figure 6:
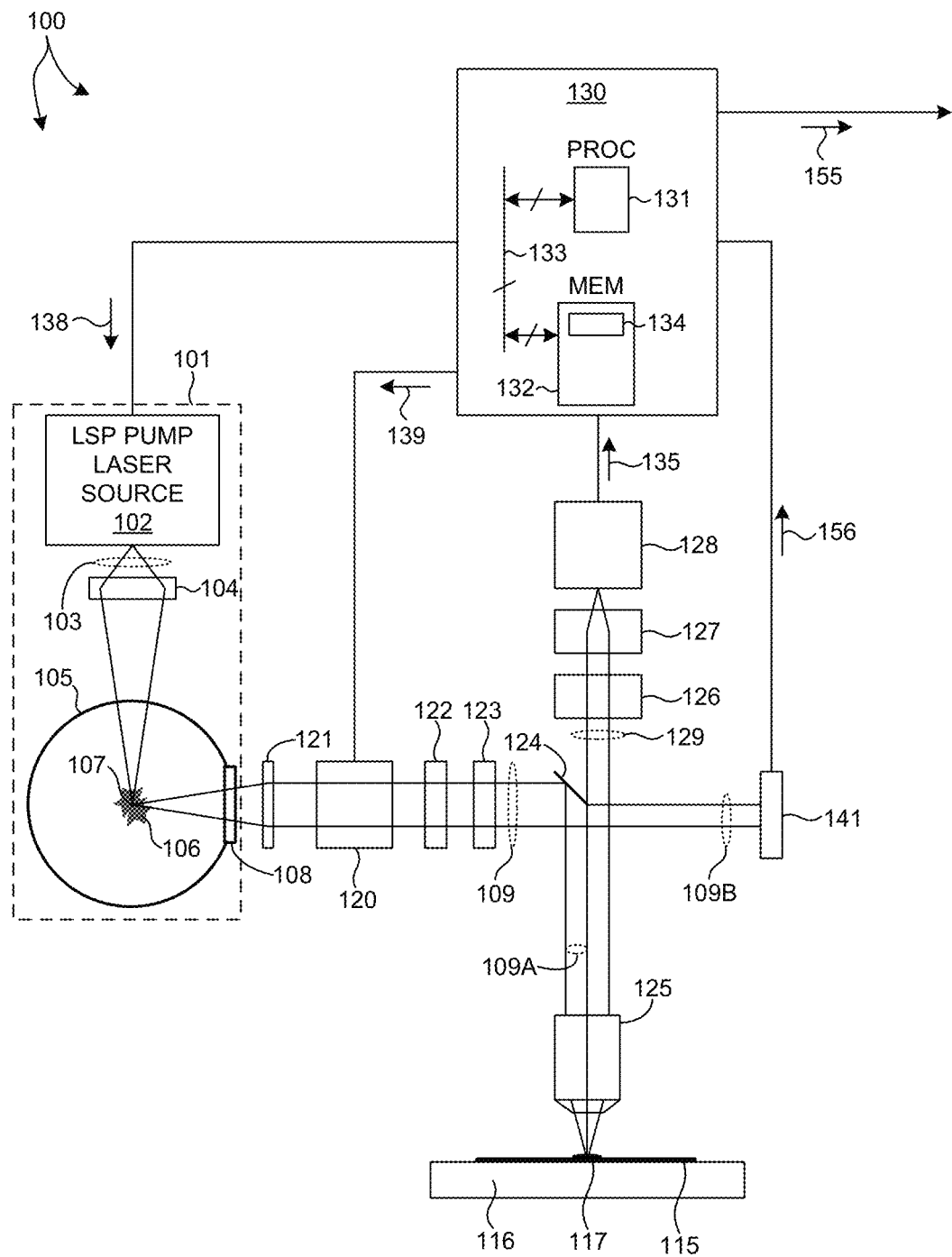
FIG. 6 depicts an exemplary metrology system 100 for performing broadband, mid-infrared Fourier Transform Infrared (FTIR) spectroscopic measurements of semiconductor structures in a reflective mode.

FIG. 6 depicts an exemplary, metrology system 100 for performing broadband mid-infrared FTIR measurements of semiconductor structures (e.g., film thickness, critical dimensions, overlay, etc.). In some examples, the one or more structures include at least one high aspect ratio (HAR) structure or at least one large lateral dimension structure. As depicted in FIG. 6, metrology system 100 is configured as near normal incidence or near normal incidence, broadband FTIR spectrometer. However, in general, metrology system 100 may also include additional measurement channels such as a spectroscopic reflectometer, a spectroscopic ellipsometer, scatterometer, or any combination thereof.

Metrology system 100 includes an illumination source 101 that generates a beam of illumination light 109 incident on a wafer 115. In a further aspect, the amount of illumination light is broadband illumination light that includes a range of wavelengths spanning at least 9 micrometers. In one example, the broadband illumination light includes wavelengths below 2.5 micrometers and wavelengths above 12 micrometers. In some examples, the broadband illumination light includes wavelengths in a range spanning at least 400 nanometers to 12,000 nanometers. In some examples, the broadband illumination light includes wavelengths in a range spanning at least 150 nanometers to 20,000 nanometers. In some embodiments, broadband illumination light including wavelengths beyond 12,000 nanometers may be employed. In some examples, broadband illumination light includes wavelengths up to 20,000 nanometers.

In some embodiments, illumination source 101 is a broadband laser sustained plasma (LSP) light source (a.k.a., laser driven plasma source) that emits illumination light in the ultraviolet, visible, near-infrared, and mid-infrared spectra. The pump laser 102 of the LSP light source 101 may be continuous wave or pulsed. In the embodiment depicted in FIG. 6, a single LSP pump laser source 102 is employed. However, in general an LSP light source 101 may employ more than one LSP pump laser source to excite photons over different wavelength ranges, thereby enhancing the brightness and power of portions of the plasma spectrum or the entire plasma spectrum. A LSP light source can produce significantly more radiance than an arc lamp across the entire wavelength range from 120 nanometers to 20,000 nanometers. As depicted in FIG. 6, control signals 138 are communicated from computing system 130 to control LSP pump laser source 102. In response, LSP pump laser source 102 adjusts its optical output, and in turn, adjusts the output of LSP light source 101 in accordance with command signals 138.

As depicted in FIG. 6, LSP pump laser source 102 generates pump light 103 focused by focusing optics 104 to a focal point 107. The focused pump light sustains a plasma 106 contained by plasma chamber 105. Plasma 106 generates broadband spectrum light over a wavelength range from vacuum ultra-violet to mid-infrared. Plasma chamber 105 includes an exit port 108 through which illumination light 109 passes. In some embodiments, plasma chamber 105 is constructed from Calcium Fluoride or Magnesium Fluoride to transmit wavelengths above 2.5 micrometers generated by plasma 106. In some other embodiments, plasma chamber 105 includes one or more exit ports (e.g., exit port 108). In some embodiments, exit port 108 is constructed from diamond to transmit light spanning a wavelength range from 2 micrometers to 20 micrometers. In some other embodiments, exit port 108 is constructed from silicon, germanium, zinc selenide, or zinc sulfide to transmit in the mid infrared region. In some other embodiments, exit port 108 is constructed from fused silica to transmit light spanning a wavelength range from 185 nanometers to 2.5 micrometers. In some other embodiments, exit port 108 is constructed from Calcium Fluoride to transmit light spanning a wavelength range from 120 nanometers to 5 micrometers. In some other embodiments, plasma chamber 105 includes at least one exit port transmitting deep ultra violet to near infrared and at least one exit port transmitting mid-infrared. In some embodiments, the LSP pump laser source 102 is a continuous wave laser. In some other embodiments, the LSP pump laser source 102 is a pulsed laser.

In general, illumination source 101 is a single light source or a combination of a plurality of broadband or discrete wavelength light sources. The light generated by illumination source 101 includes a continuous spectrum or parts of a continuous spectrum, from ultraviolet to mid-infrared (e.g., vacuum ultraviolet to mid infrared). In general, illumination light source 101 may include a LSP light source, a supercontinuum laser source, an infrared supercontinuum source, a set of quantum cascade lasers, an infrared helium-neon laser source, an arc lamp (e.g., a Xenon arc lamp), a deuterium lamp, a thermal light source (e.g., globar light source), a quantum cascade laser source, any other suitable light source, or any combination thereof.

As depicted in FIG. 6, collimating optics 121 collimate light 109 from plasma 106 and directs the collimated light to FTIR interferometer 120 (e.g., a Michaelson interferometer). In some other embodiments, focusing optics (not shown) collect light from plasma 106 and focus the collected light to an illumination source field stop (not shown). The illumination source field stop defines a stable source size and position. Light passing through the illumination source field stop is collimated by collimating optics 121 and directed to FTIR interferometer 120.

FTIR interferometer 120 includes a beam splitting element that subdivides the illumination light into two different optical paths. In some embodiments, a first optical path has a fixed optical path length, while a second optical path includes a moveable optical element that varies the optical path length of the second optical path. The two optical paths are recombined. The resulting wave interference pattern (i.e., interferogram) depends on the difference in optical path length (i.e., the optical path difference) at any particular position of the moveable optical element. Thus, depending on the position of the moveable optical element, some source wavelengths are heavily (or completely) attenuated and other source wavelengths are transmitted without attenuation. In this manner, the position of the moveable optical element defines the output spectrum of the FTIR interferometer at any given instant. As the position of moveable optical element changes, the output spectrum of the FTIR interferometer also changes, and measurements are performed over a changing combination of illumination wavelengths.

As depicted in FIG. 6, control signals 139 are communicated from computing system 130 to control FTIR interferometer 120. In response, FTIR interferometer 120 controls the position of one or more moveable optical elements, which in turn, adjusts the spectral output of the FTIR interferometer 120 in accordance with command signals 139.

As depicted in FIG. 6, diffractive polarizer 122 collects the illumination light transmitted by FTIR interferometer 120 and transmits light having a specific polarization state. In some embodiments, diffractive polarizer 122 is a wire grid polarizer. In some embodiments, polarizer 122 is a dynamic polarizer that transmits different polarizations as a function of time (e.g., a rotating polarizer). In these embodiments, measurements are performed over time with different polarization states. Although the embodiment depicted in FIG. 6 includes a diffractive polarizer 122, in general, FTIR measurements may be performed with or without the use of a polarizer 122 in the illumination beam path and corresponding analyzer 126 in the collection beam path.

As depicted in FIG. 6, optional illumination optics 123 conditions light from polarizer 122. In an example, optional illumination optics 123 increases or decreases beam size. In another example, optional illumination optics 123 changes the state of beam collimation. In another example, optional illuminator optics 123 includes a second illumination field stop (not shown) that blocks higher order diffracted light from polarizer 122.

Beam sampler 124 samples a portion of the light exiting the illumination field stop and directs the light to reflective objective 125. In a preferred embodiment, beam sampler 124 is a half mirror (e.g., a mirror positioned to sample 50% of the beam footprint of illumination light 109). In the preferred embodiment, beam sampler 124 is entirely reflective. This enables the use of materials that reflect mid-infrared light (i.e., light having wavelengths all the way out to 20 micrometers) with high efficiency (e.g., gold, silver, etc.). However, in general, beam divider 124 may be any suitable beam sampling optical element. As depicted in FIG. 6, beam sampler 124 reflects a portion 109A of illumination light 109 and directs illumination light 109A toward objective 125. The remaining portion 109B of illumination light 109 propagates to a detector 141. Detector 141 generates output signals 156 indicative of the condition of illumination light 109B (e.g., intensity, position, intensity distribution, etc.) and by proxy, the condition of illumination light 109A directed toward the sample under measurement. In this manner, computing system 130 generates control signals (e.g., control signals 138) to control any of illumination source 101, interferometer 120, polarizer 122, and illumination optics 123 to change the condition of illumination light 109A to a desired specification.

Reflective objective 125 focuses the illumination light 109A over an illumination spot 117 on wafer 115. Reflective objective 125 also collects light 129 reflected from wafer 115 in response to incident illumination light 109A and directs the collected light 129 to analyzer 126. Collected light 129 passes through beam sampler 124, analyzer 126, and collection optics 127. As an example, in the case where beam sampler 124 is a half mirror, collection light 129 is spatially separated from beam sampler 124 and collection light 129 is not attenuated by beam sampler 124. In some embodiments, collection optics 127 focuses collected light 129 onto an active sensing surface of detector 128. In some other embodiments, collection optics 127 focuses collected light 129 at a collection field stop (not shown). Additional optical elements (not shown) collect light from the collection field stop and direct the light onto an active sensing surface of detector 128.

In some embodiments, detector 128 is sensitive to mid-infrared light including any wavelength within a range of 2 to 12 micrometers. In some embodiments, detector 128 is sensitive to mid-infrared light including any wavelength within a range of 2 to 20 micrometers. In some embodiments, detector 128 includes a HgCdTe sensor. In some embodiments, the photosensitive sensor of detector 128 is cooled to the temperature of liquid nitrogen. In addition, in some embodiments, detector 128 includes a Stirling cooler employed to transfer heat away from the active sensing elements.

Detector 128 generates detected signals 135 indicative of the optical response of the measured structures on wafer 115 to the illumination light 109. Detector 128 communicates detected signals 135 to computing system 130. The detected signals 135 vary with the response of the wafer 115 to the known spectrum generated by FTIR interferometer 120. Computing system 130 employs the Fourier Transform to process detected signals 135 based on the known spectrum generated by FTIR interferometer 120. In this manner, computing system 130 determines the reflectivity of the measured target at each wavelength (i.e., spectral response of the measured target). In turn, computing system 130 determines a value of a parameter of interest 155 associated with the measured target based on the measured spectral response.

FIG. 6 depicts an embodiment of a mid-infrared FTIR based metrology system operating in a reflective mode (i.e., the illumination light is provided to the wafer on the same side as the light collected from the wafer). In other embodiments, a mid-infrared FTIR based metrology system is configured to operate in a transmission mode (i.e., the illumination light is provided to the wafer on the opposite side as the light collected from the wafer).

Figure 7:
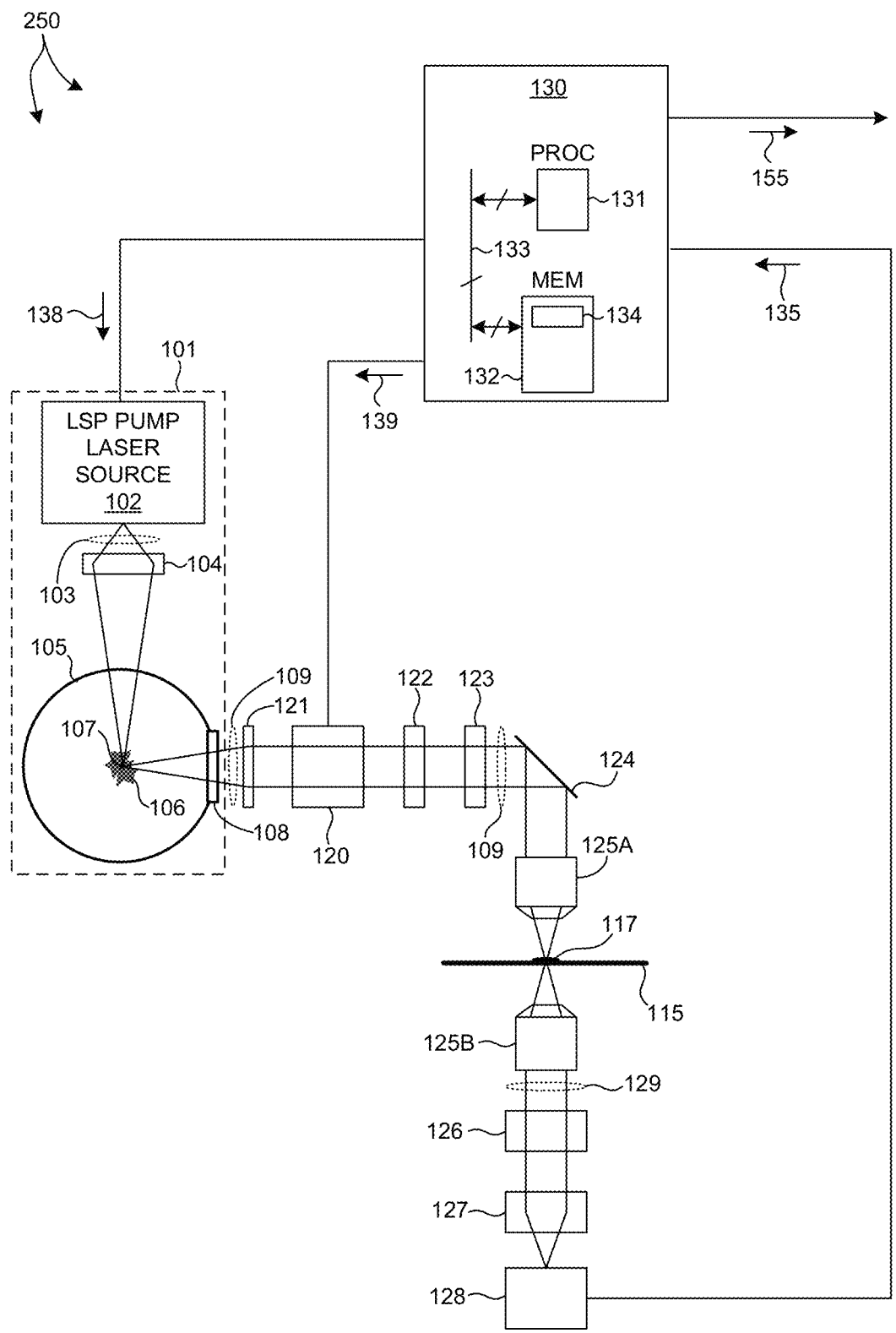
FIG. 7 depicts an exemplary metrology system 250 for performing broadband, mid-infrared Fourier Transform Infrared (FTIR) spectroscopic measurements of semiconductor structures in a transmissive mode.

FIG. 7 depicts an embodiment 250 of a mid-infrared FTIR based metrology system operating in a transmission mode. Like numbered elements are analogous to those described with reference to FIG. 6. As depicted in FIG. 7, a beam sampler 124 is employed to direct illumination light 109 to reflective objective 125A. In some embodiments, beam sampler 124 is a full aperture mirror. Reflective objective 125A focuses the illumination light 109 over an illumination spot 117 on wafer 115 as described with reference to reflective objective 125 depicted in FIG. 6.

As depicted in FIG. 7, reflective objective 125B collects light 129 transmitted through wafer 115 in response to incident illumination light 109 and directs the collected light 129 to analyzer 126. Collected light 129 passes through analyzer 126 and collection optics 127. In some embodiments, collection optics 127 focuses collected light 129 onto an active sensing surface of detector 128. In some other embodiments, collection optics 127 focuses collected light 129 at a collection field stop (not shown). Additional optical elements (not shown) collect light from the collection field stop and direct the light onto an active sensing surface of detector 128.

In a further aspect, a metrology system incorporating a mid-infrared FTIR spectrometer as described herein also includes one or more additional measurement channels operating in one or more different wavelength ranges below mid-infrared (e.g., less than 2 micrometers) or within mid-infrared (e.g., between 2 and 20 micrometers). In some embodiments, a mid-infrared FTIR spectrometer and one or more additional measurement channels measure a target simultaneously. In other embodiments, a mid-infrared FTIR spectrometer and one or more additional measurement channels measure a target sequentially. In general, a mid-infrared FTIR spectrometer operating in combination with one or more additional measurement subsystems may measure a target at multiple different angles of incidence, azimuth angles, different wavelength ranges, different polarization states, or any combination thereof.

In some embodiments a mid-infrared FTIR spectrometer operates in combination with a hard X-ray metrology subsystem, a soft X-ray metrology subsystem, a spectroscopic ellipsometer, a spectroscopic reflectometer, a hyperspectral imaging subsystem, a scatterometer subsystem, or any combination thereof.

In some embodiments, a mid-infrared FTIR spectrometer operates in combination with a broadband spectrometer channel operating in a wavelength range from 190 nanometers to 2500 nanometers. In some embodiments, a mid-infrared FTIR spectrometer operates in combination with both a broadband spectrometer channel operating in a wavelength range from 190 nanometers to 2500 nanometers and another spectrometer channel operating in a wavelength range from 120 nanometers to 190 nanometers.

Figure 8:
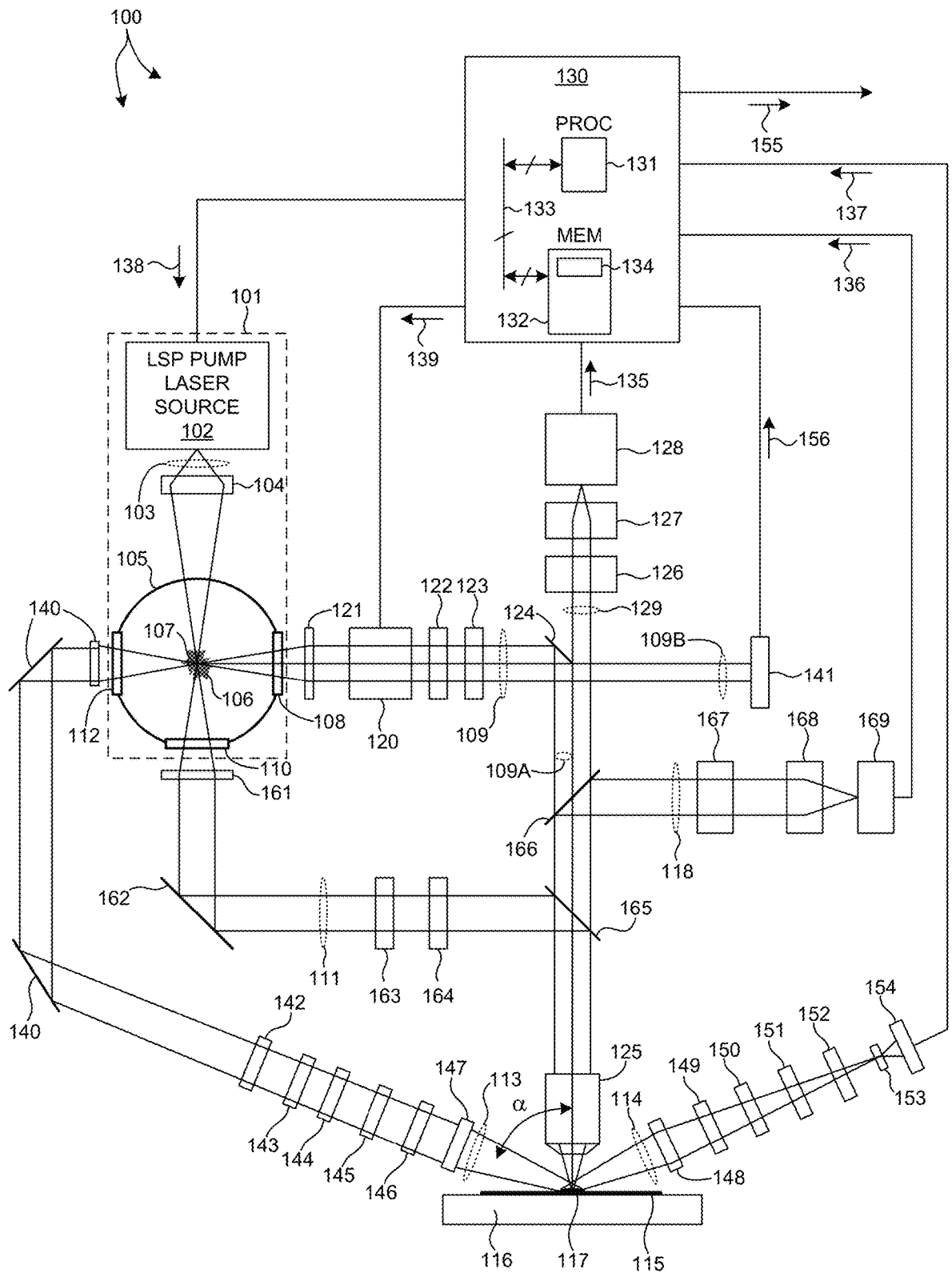
FIG. 8 depicts an exemplary metrology system 100 for performing combined broadband, mid-infrared FTIR spectroscopic measurements, spectroscopic ellipsometry measurements, and spectroscopic reflectometry measurements of semiconductor structures.

FIG. 8 depicts a metrology system 100 including a mid-infrared FTIR spectrometer as described with reference to FIG. 6, a spectroscopic reflectometer (SR) measurement channel, and a spectroscopic ellipsometer (SE) measurement channel. Like numbered elements are analogous to those described with reference to FIG. 6. In the embodiment depicted in FIG. 8, the measurement spot of the FTIR, SR, and SE spectrometers are co-located. In some other embodiments, the measurement spots are not co-located.

As depicted in FIG. 8, LSP illumination source 101 includes additional exit ports 110 and 112. Exit port 110 transmits light to the SR measurement channel, and exit port 112 transmits light to the SE measurement channel. Exit ports 110 and 112 may be constructed from a material that transmits light below the mid-infrared range (e.g., below 2.5 nanometers). In some embodiments, exit ports 110 and 112 are constructed from fused silica, Calcium Fluoride, Magnesium Fluoride, etc. In the embodiment depicted in FIG. 8, exit port 112 is constructed from a vacuum ultraviolet light transmitting material. In some embodiments, exit port 112 transmits illumination wavelengths ranging from 190 nanometers to 2,500 nanometers. In another example, exit port 112 transmits whole or parts of illumination wavelengths ranging from 120 nanometers to 2,500 nanometers. In addition, exit port 110 transmits the whole or parts of illumination wavelengths ranging from 120 nanometers to 2,500 nanometers. In the embodiment depicted in FIG. 8, LSP illumination source 101 generates illumination light having wavelengths ranging from vacuum ultraviolet light though mid-infrared light (i.e., 120 nanometers to 20 micrometers) with high brightness and small illumination source spot size.

As depicted in FIG. 8, optical elements 161 collect SR illumination light 111 transmitted through exit port 110, and direct SR illumination light 111 toward an optional mirror 162, which directs SR illumination light 111 to polarizing component 163. In some other embodiments, focusing optics (not shown) collect SR illumination light 111 transmitted through exit port 110 and focus the collected light to an illumination source field stop (not shown). The illumination source field stop defines a stable source size and position. Light passing through the illumination source field stop is directed to polarizing component 163. In some embodiments, the polarizing component is a polarizer, a compensator, or both, and may include any suitable commercially available polarizing component. The polarizing component can be fixed or rotatable to different fixed positions. Although the SR illumination subsystem depicted in FIG. 8 includes one polarizing component, the SR illumination subsystem may include more than one polarizing component. As depicted in FIG. 8, optional illumination optics 164 collects light from polarizing component 163 and conditions SR illumination light 111 directed to beam sampler 165. In an example, optional illumination optics 164 changes illumination light 111 beam size or beam divergence. In another example, optional illumination optics 164 focuses SR illumination light 111 to an illumination field stop (not shown). Beam sampler 165 samples a portion of the light exiting the illumination field stop and directs the light to reflective objective 125. In some embodiments, beam sampler 125 is a dichroic filter. In some other embodiments, beam sampler 125 is a flip in mirror. Reflective objective 125 focuses the illumination light 111 over an illumination spot 117 on wafer 115. Reflective objective 125 also collects SR collected light 118 reflected from wafer 115 in response to incident illumination light 111 and directs the collected light 118 to analyzer 167. Collected light 118 passes through beam splitter 165 and reflects from beam sampler 166 toward analyzer 167, and collection optics 168. In an example, beam sampler 166 is a dichroic filter. In some other embodiments, beam sampler 166 is a flip in mirror. In some other embodiments, beam samplers 165 and 166 flip in to sample SR illumination light 111 and SR collection light 118 and flip out of the SR illumination light 111 and SR collection light 118 for FTIR measurements. In some embodiments, collection optics 168 focuses collected light 118 onto an active sensing surface of detector 169. In some other embodiments, collection optics 168 focuses collected light 118 at a collection field stop (not shown). Additional optical elements (not shown) collect light from the collection field stop and direct the light onto an active sensing surface of detector 169.

In some embodiments, detector 169 is sensitive to vacuum ultraviolet, deep ultraviolet, ultraviolet, visible, and near-infrared light including any wavelength within a range of 120 nanometers to 2.5 micrometers. In some embodiments, detector 169 is a charge coupled device (CCD) sensitive to ultraviolet and visible light (e.g., light having wavelengths between 190 nanometers and 860 nanometers). However, in general, other two dimensional detector technologies may be contemplated (e.g., a position sensitive detector (PSD), a photovoltaic detector, etc.). Detector 169 converts the incident light into electrical signals indicative of the spectral intensity of the incident light.

As depicted in FIG. 8, detector 169 generates detected signals 136 indicative of the optical response of the measured structures on wafer 115 to the illumination light 111. Detector 169 communicates detected signals 136 to computing system 130.

As depicted in FIG. 8, SE illumination light 113 is extracted from plasma chamber 105 via exit port 112. Optional SE source optics 140 condition and redirect illumination light 113 towards SE illumination optics entrance port 142. SE illumination light 113 passes through optional optical filters 143, polarizing component 144, field stop 145, aperture stop 146, and illumination optics 147. The one or more optical filters 143 control light level, spectral output, or both, from the illumination subsystem. In some examples, one or more multi-zone filters are employed as optical filters 143. Polarizing component 144 generates the desired polarization state exiting the illumination subsystem. In some embodiments, the polarizing component is a polarizer, a compensator, or both, and may include any suitable commercially available polarizing component. The polarizing component can be fixed or rotatable to different fixed positions. Although the illumination subsystem depicted in FIG. 8 includes one polarizing component, the illumination subsystem may include more than one polarizing component. Field stop 145 controls the field of view (FOV) of the illumination subsystem and may include any suitable commercially available field stop. Aperture stop 146 controls the numerical aperture (NA) of the illumination subsystem and may include any suitable commercially available aperture stop. Light from LSP illumination source 101 is directed through illumination optics 147 to be focused on one or more structures on wafer 115 at an oblique angle, a. The illumination subsystem may include any type and arrangement of optical filter(s) 143, polarizing component 144, field stop 145, aperture stop 146, and illumination optics 147 known in the art of spectroscopic ellipsometry.

As depicted, in FIG. 8, the beam of illumination light 113 passes through optical filter(s) 143, polarizing component 144, field stop 145, aperture stop 146, and illumination optics 147 as the beam propagates from the illumination source 101 to wafer 115. Beam 113 illuminates a portion of wafer 115 over a measurement spot 117.

In some examples, the beam size of the amount of illumination light 113 projected onto the surface of wafer 115 is smaller than a size of a measurement target that is measured on the surface of the specimen. Exemplary beam shaping techniques are described in detail in U.S. Patent Application Publication No. 2013/0114085 by Wang et al., the contents of which are incorporated herein by reference in their entirety. In one aspect, the use of a LSP illumination source enables very small illumination spot size on all measurement channels of metrology system 100. In some embodiments, a LSP illumination source generates plasma having a size of approximately 100 micrometers. This small sized illumination source is, in turn, projected onto the wafer with a magnification of approximately 10 times. Thus, in principle, in some embodiments, an illumination spot size of approximately 10 micrometers is achieved. This can be further reduced in size by passing the illumination light through an illumination aperture. For example, a 100 micrometer source size may be reduced to 50 micrometers using an illumination aperture, which is, in turn, projected onto the wafer with a magnification of approximately 10 times. Thus, in principle, in some embodiments, an illumination spot size of approximately 5 micrometers is achieved. In some embodiments, beam apodization optics are used to reduce the illumination spot size at the wafer. However, attenuation by use of the illumination aperture comes at a cost of lost photons. In some embodiments, illumination light is projected from an LSP light source onto the wafer with an illumination spot size of 50 micrometers, or less, without significant beam apodization (e.g., less than 10% photon loss due to apodization). In some embodiments, illumination light is projected from an LSP light source onto the wafer with an illumination spot size of 25 micrometers, or less, without significant beam apodization (e.g., less than 10% photon loss due to apodization). As described herein, the spot size is defined by the distance along the longest direction of extent of the illumination spot. For example, the size of a circular illumination spot is defined by the diameter of the circle. In another example, the size of an elliptical illumination spot is defined by the distance across the ellipse along the major axis.

In contrast, the minimum spot size of a thermal illumination source such as a globar light source is approximately 2,000 micrometers which is, in turn, projected onto the wafer with a magnification of approximately 10 times. Thus, in principle, an illumination spot size of approximately 200 micrometers is achieved by a globar light source. Further reductions in spot size may be achieved by use of an illumination aperture, but to achieve a spot size comparable to a LSP light source requires a severe loss of photons. For this reason, it is preferable to employ a LSP light source for semiconductor metrology based on FTIR spectroscopy.

Metrology system 100 also includes a collection optics subsystem configured to collect light generated by the interaction between the one or more structures and the incident illumination beam 113. A beam of collected light 114 is collected from measurement spot 117 by collection optics 148. Collected light 114 passes through collection aperture stop 149, polarizing element 150 and field stop 151 of the collection optics subsystem.

Collection optics 148 includes any suitable optical elements to collect light from the one or more structures formed on wafer 115. Collection aperture stop 149 controls the NA of the collection optics subsystem. Polarizing element 150 analyzes the desired polarization state. The polarizing element 150 is an analyzer or a compensator. The polarizing element 150 can be fixed or rotatable to different fixed positions. Although the collection subsystem depicted in FIG. 8 includes one polarizing element, the collection subsystem may include more than one polarizing element. Collection field stop 151 controls the FOV of the collection subsystem. The collection subsystem takes light from wafer 115 and directs the light through collection optics 148 and polarizing element 150 to be focused on collection field stop 151. In some embodiments, collection field stop 151 is used as a spectrometer slit for the spectrometers of the detection subsystem. However, collection field stop 151 may be located at or near a spectrometer slit 152 of the spectrometers of the detection subsystem.

The collection subsystem may include any type and arrangement of collection optics 148, aperture stop 149, polarizing element 150, and field stop 151 known in the art of spectroscopic ellipsometry.

In the embodiment depicted in FIG. 8, the collection optics subsystem directs light to a spectrometer of the detection subsystem. The detection subsystem generates output responsive to light collected from the one or more structures illuminated by the illumination subsystem. In the embodiment depicted in FIG. 8, collected light 114 passes through spectrometer slit 152 and is incident on diffractive element 153. Diffractive element 153 is configured to spatially separate wavelengths of the incident light at the light sensitive surface of detector 154. In one example, detector 154 is a charge coupled device (CCD) sensitive to vacuum ultraviolet and ultraviolet (e.g., light having wavelengths between 120 nanometers and 400 nanometers). In another example, detector 154 is a charge coupled device (CCD) sensitive to deep ultraviolet to near infrared (e.g., light having wavelengths between 190 nanometers and 950 nanometers). In another example, detector 154 is a near infrared sensor (e.g., sensitive to light having wavelengths between 850 nanometers and 2500 nanometers).

Metrology system 100 also includes computing system 130 configured to receive detected signals 135, 136, and 137, including the spectral response of wafer 115 to VUV, DUV, visible, near-infrared, and mid-infrared illumination. Furthermore, computing system 130 determines an estimate 155 of a value of a parameter of interest of the measured structure(s) based on detected signals 135, 136, and 137. By simultaneously collecting measurement signals 135, 136, and 137, measurement times are reduced and all spectra are measured with the same alignment conditions. This allows wavelength errors to be corrected more easily because a common correction can be applied to all spectral data sets.

In another aspect, the mid-infrared FTIR spectrometers described herein employ off-axis illumination, collection, or both, to reject measurement signals generated by reflections from the bottom of the underlying substrate.

Figure 9:
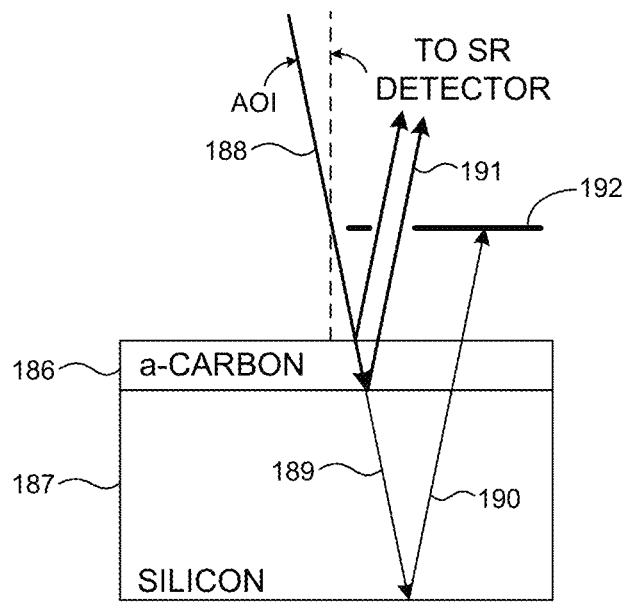
FIG. 9 depicts illumination incident onto a film layer disposed on a substrate at near normal incidence, but specifically avoiding normal incidence.

FIG. 9 depicts illumination 188 incident onto film layer 186, which is disposed on substrate 187. As depicted in FIG. 9, the illumination is arranged at near normal incidence, but specifically avoiding normal incidence (AOI=zero degrees). A portion of incident light reflects from the surface of film 186, another portion 191 reflects from the interface between film 186 and substrate 187. These reflections are desirable and must be collected to estimate the thickness of film 186 based on a reflectometry technique. However, in addition, a portion 189 of the incident light 188 penetrates the substrate 187. A portion 190 of light 188 reflects from the bottom of the substrate (e.g., the backside of a wafer), propagates through substrate 187 and film 186. Light 190 is undesirable and contaminates the measurement of film 186. As depicted in FIG. 9, a collection aperture 192 is successfully employed to block the undesirable light 190 reflected from the back surface of the substrate 187. This is possible because the non-zero angle of incidence of the illumination creates a spatial separation between light reflected from the top and bottom surfaces of film 186 and light 190 reflected from the bottom of substrate 187.

Figure 10:
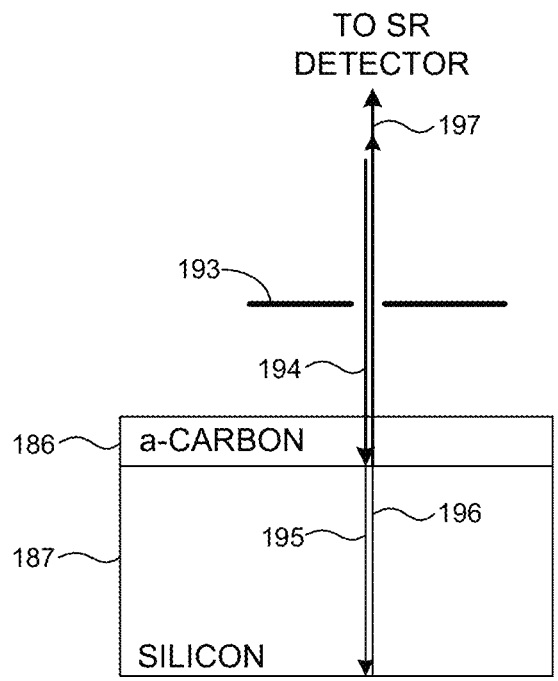
FIG. 10 depicts illumination incident onto a film layer disposed on a substrate at normal incidence.

In contrast, FIG. 10 depicts illumination 194 incident onto film layer 186, which is disposed on substrate 187. As depicted in FIG. 10, the illumination is arranged at normal incidence. A portion of incident light reflects from the surface of film 186, another portion reflects from the interface between film 186 and substrate 187. In addition, a portion 195 of the incident light 194 penetrates the substrate 187. A portion 196 of light 195 reflects from the bottom of the substrate (e.g., the backside of a wafer), propagates through substrate 187 and film 186. Light 196 is undesirable and contaminates the measurement of film 186. As depicted in FIG. 10, a collection aperture 193 is unable to block the undesirable light 196 reflected from the back surface of the substrate 187 because the zero angle of incidence of the illumination does not generate spatial separation between light reflected from the top and bottom surfaces of film 186 and light 187 reflected from the bottom of substrate 187.

Thus, in some embodiments, it is preferable to perform mid-infrared FTIR measurements and spectroscopic reflectometry measurements as described herein at non-zero angles of incidence. In this manner, light generated from backside reflections can be effectively blocked from the measurement. In some embodiments, oblique illumination is employed to reduce measurement sensitivity to backside reflections as described with reference to FIG. 9, and also illustrated in embodiments of FIG. 11. In some other embodiments, normal illumination is employed, but an obscuration mask 223 in the collection path at or near the collection aperture stop or its conjugates, is employed to block the central rays over the numerical aperture such that the back side reflection is not admitted into the measurement optics as illustrated in embodiment of FIG. 12. This approach enables normal illumination incidence, but suffers from possible disadvantages such as a centrally obscured pupil, light loss, and algorithmic complexity. In some other embodiments, obscuration 223 is located in the illumination path.

Figure 11:
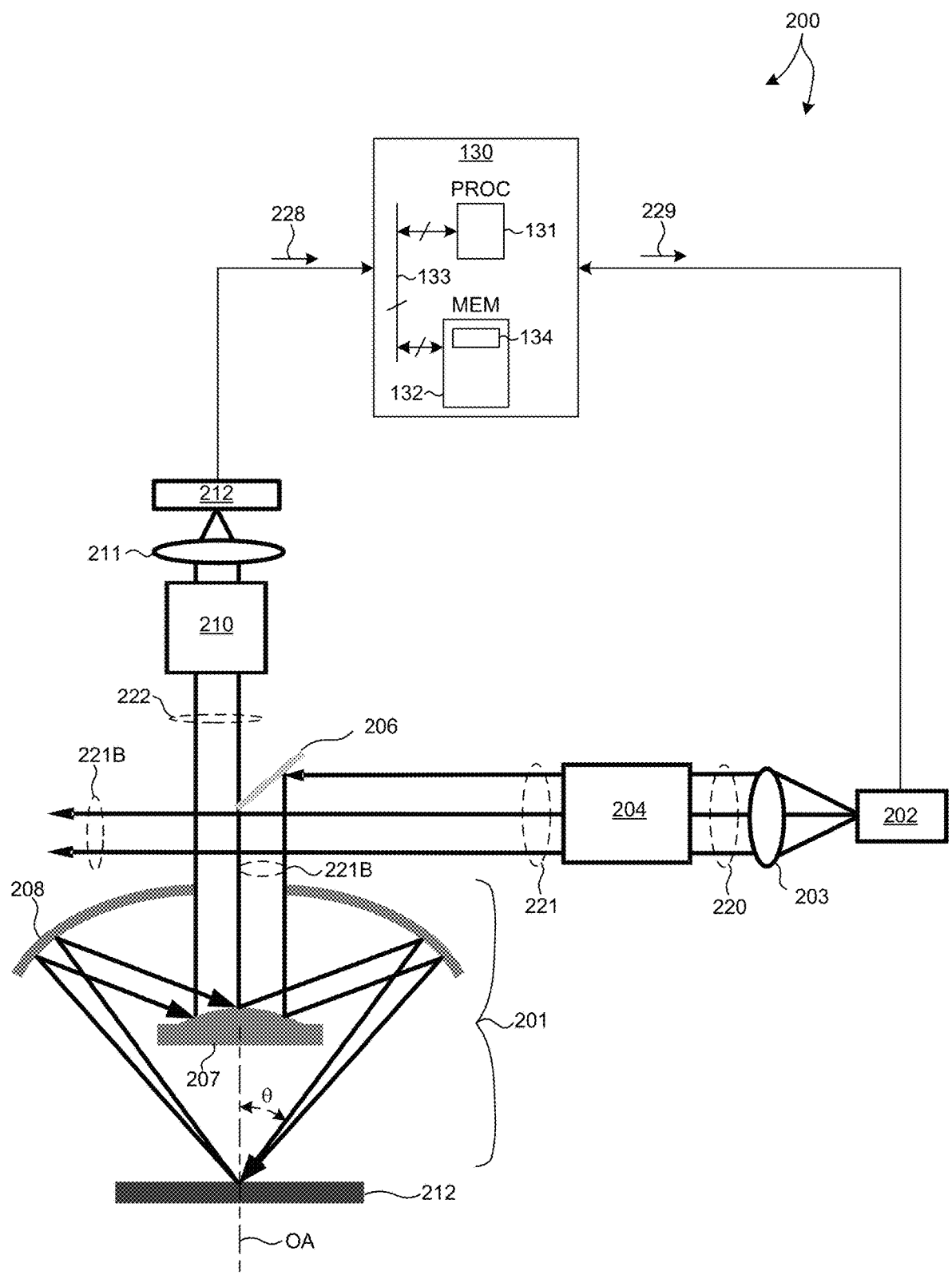
FIG. 11 depicts an infrared spectroscopic reflectometer including a Schwartzchild objective to avoid normal incidence.

FIG. 11 depicts an infrared spectroscopic reflectometer including one or more measurement channels spanning a wavelength range between 750 nanometers and 2600 nanometers in another embodiment. In one aspect, infrared spectroscopic reflectometer 200 includes a Schwartzchild objective to avoid normal incidence. A Schwartzchild objective as described herein may be employed as an objective in an FTIR measurement channel as described with reference to FIGS. 6 and 8. As depicted in FIG. 11, infrared spectroscopic reflectometer 200 includes polarizer 204, objective 201, analyzer 210, and spectrometer 212. As depicted in FIG. 11, a light beam is generated by the illumination source 202 in response to command signals received from computing system 130. Light from illumination source 202 is conditioned by optional beam forming optics 203 to generate an illumination light beam 220. Illumination light beam 220 is directed to polarizer 204. Although, as depicted, illumination light directed to polarizer 204 comes from illumination source 202, in general, light from any of the illumination sources of system 100 may be combined to generate an illumination light beam directed to polarizer 204. In this manner, the spectral components of the illumination light can be configured as a combination of light emitted from multiple illumination sources.

In some embodiments, polarizer 204 is configured to selectively rotate a polarizing element about the optical axis of the illumination light beam 220. In general, polarizer 204 may include any polarizing element and system to rotate the polarizing element known in the art. For example, the polarizer 204 may include a polarizing element mechanically coupled to a rotational actuator. In one example, the polarizing element may be a Rochon prism. In another example, the polarizing element may include a beam displacer. Polarizer 204 is configured to operate within system 200 in either a rotationally active or rotationally inactive state. In one instance, a rotational actuator of polarizer 204 may be inactive such that the polarizing element remains rotationally fixed about the optical axis of illumination light 220. In another instance, the rotational actuator may rotate the polarizing element at a selected angular frequency, $\omega_p$, about the optical axis of the illumination light.

In some other embodiments, polarizer 204 is configured with a fixed polarization angle about the optical axis of the illumination light beam 220.

As depicted in FIG. 11, illumination light beam 220 passes through polarizer 204 while the rotational actuator rotates the polarizing element at the selected angular frequency, $\omega_p$. In this manner, polarizer 204 generates a polarized light beam 221 directed toward beam sampler 206. Beam sampler 206 directs a portion 221B of the polarized light beam 221 towards objective 201. The remaining portion 221B of the polarized light beam 221 is directed towards a beam dump (not shown) or a detector (not shown) to provide feedback to computing system 130 regarding beam condition as described with reference to FIG. 6.

In the embodiment depicted in FIG. 11, objective 201 is a Schwartzschild type objective including reflective optical elements only. The Schwartzschild objective depicted in FIG. 11 includes a concave mirror 208 with an opening (e.g., hole) aligned with the optical axis, OA, to allow light to pass in and out of the objective 201. Incoming light passes through the opening, and reflects off convex mirror 207 toward concave mirror 208. The reflected light is focused on the surface of wafer 212 by concave mirror 208. The polarized light beam 221 is focused onto the surface of wafer 212 over a range of angles of incidence by objective 201, but not at a zero angle of incidence (i.e., normal to the surface of wafer 212). In some examples, polarized light beam 221 is focused onto the surface of wafer 212 within a range of angles of incidence between 5 and 40 degrees. In some other examples, polarized light beam 221 is focused onto the surface of wafer 212 within a range of angles of incidence between 5 and 25 degrees. In some examples, a portion of polarized light beam 221 is focused onto the surface of wafer 212 at an angle of incidence less than 20 degrees. In some other examples, a portion of polarized light beam 221 is focused onto the surface of wafer 212 at an angle of incidence less than 15 degrees. In some examples, the polarized light beam 221 is focused onto the surface of wafer 212 at small angles of incidence results in a small illumination spot. In some examples, the resulting illumination spot is less than 20 micrometers in diameter. In some other examples, the resulting illumination spot size is less than 10 micrometers in diameter.

The interaction of the focused, polarized light beam 221 with wafer 212 modifies the polarization of the radiation by any of reflection, scattering, diffraction, transmission, or other types of processes. After interaction with the wafer 212, modified light 222 is collected by objective 201 and directed to beam sampler 206. Light from wafer 212 is collected by concave mirror 208 and focused onto convex mirror 207 where it exits the Schwartzschild objective through the same hole as the incoming light toward beam sampler 206. Beam sampler 206 is configured to transmit modified light 222 toward analyzer 210. In the embodiment depicted in FIG. 11, analyzer 210 includes a polarizer element that remains rotationally fixed about the optical axis of modified light beam 222 while the modified light beam 222 passes through the analyzer 210 and optional beam focusing optics 211 to spectrometer 212. In spectrometer 212, the beam components having different wavelengths are refracted (e.g., in a prism spectrometer) or diffracted (e.g., in a grating spectrometer) in different directions to different detectors. The detectors may be a linear array of photodiodes, with each photodiode measuring radiation in a different wavelength range. The radiation received by the spectrometer 212 is analyzed with regard to polarization state, allowing for spectral analysis by the spectrometer of radiation passed by the polarizer 212. These spectra 228 are passed to computing system 130 for analysis of the structural characteristics of wafer 212.

Figure 12:
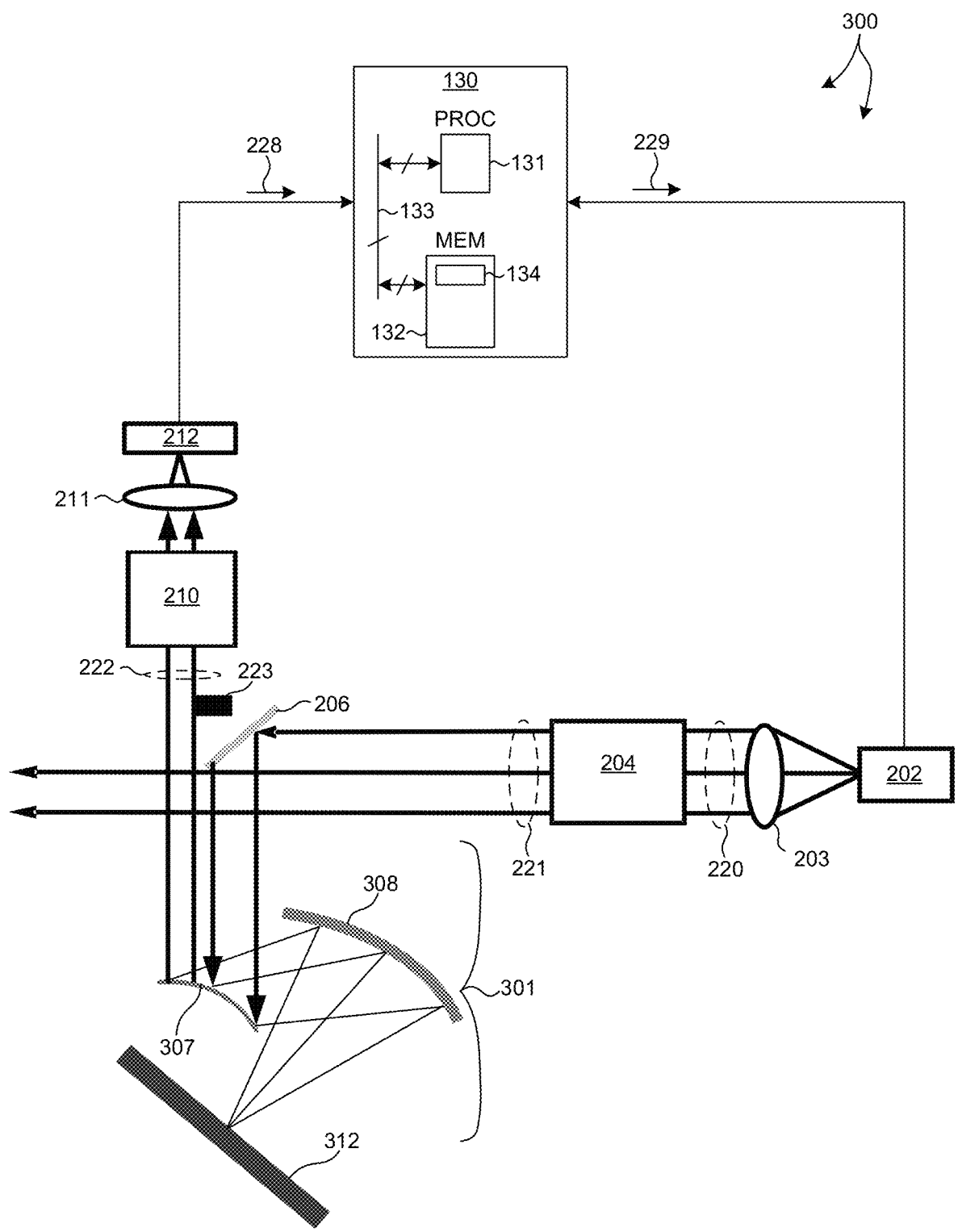
FIG. 12 depicts an infrared spectroscopic reflectometer including an off-axis, unobscured objective lens to achieve oblique incidence.

FIG. 12 depicts an infrared spectroscopic reflectometer including one or more measurement channels spanning a wavelength range between 750 nanometers and 2600 nanometers in another embodiment. In one aspect, infrared spectroscopic reflectometer 300 includes an off-axis unobscured objective lens 301 to achieve oblique incidence. An off-axis unobscured objective lens as described herein may be employed as an objective in an FTIR measurement channel as described with reference to FIGS. 6 and 8.

As depicted in FIG. 12, infrared spectroscopic reflectometer 300 is analogous to infrared spectroscopic reflectometer 200 described with reference to FIG. 11. However, instead of a Schwartzchild objective, an off-axis unobscured objective lens 301 is employed. Incoming light reflects off convex mirror 307 toward concave mirror 308. The reflected light is focused on the surface of wafer 312 by concave mirror 308. The polarized light beam 221 is focused onto the surface of wafer 312 over a range of angles of incidence by objective 301. In some examples, polarized light beam 221 is focused onto the surface of wafer 312 within a range of angles of incidence between 5 and 40 degrees. In some other examples, polarized light beam 221 is focused onto the surface of wafer 312 within a range of angles of incidence between 5 and 25 degrees. In some examples, a portion of polarized light beam 221 is focused onto the surface of wafer 312 at an angle of incidence less than 20 degrees. In some other examples, a portion of polarized light beam 221 is focused onto the surface of wafer 312 at an angle of incidence less than 15 degrees. Polarized light beam 221 is focused onto the surface of wafer 312 at small angles of incidence results in a small illumination spot. In some examples, the resulting illumination spot is less than 20 micrometers in diameter. In some other examples, the resulting illumination spot size is less than 10 micrometers in diameter. In some examples, an illumination mask with a central obscuration, such as mask 223 depicted in FIG. 12, is located at or near an illumination pupil.

The interaction of the focused, polarized light beam 221 with wafer 312 modifies the polarization of the radiation by any of reflection, scattering, diffraction, transmission, or other types of processes. After interaction with the wafer 312, modified light 222 is collected by objective 301 and directed to beam sampler 206. Light from wafer 312 is collected by concave mirror 308 and focused onto convex mirror 307 where it is collimated and exits objective 301 toward beam sampler 206. In some other examples, a collection mask having a central obscuration, such as mask 223 depicted in FIG. 12, is located at or near the collection pupil.

Exemplary implementations of off-axis unobscured objective lenses are described in detail in U.S. Patent Application Publication No. 2016/0139032 by Rampoldi et al., the contents of which are incorporated herein by reference in their entirety.

In general, the reflective objectives described with reference to FIGS. 11 and 12 are exemplary embodiments of reflective objective 125 depicted in FIGS. 6 and 8 when off-axis illumination, collection, or both, is implemented for mid-infrared FTIR measurements SR measurements, or both.

As depicted in FIGS. 6, 8, 11, and 12, the illustrated measurement channels include a polarizer on the illumination side and an analyzer on the collection side. However, in general, it is contemplated that any measurement channel may include, or not include, an illumination polarizer, a collection analyzer, an illumination compensator, a collection compensator, in any combination, to perform measurements of the polarized reflectivity of the sample, unpolarized reflectivity of the sample, or both.

In some embodiments, one or more measurement channels of the metrology systems described herein are configured to measure the wafer at different azimuth angles, in addition to different ranges of wavelength and angle of incidence. In some embodiments, a metrology system including a mid-infrared FTIR spectrometer as described herein is configured to perform measurements of the wafer at azimuth angles of zero and ninety degrees relative to the metrology target. In some embodiments, the metrology system is configured to measure wafer reflectivity over one or more wavelength ranges, one or more AOI ranges, and one or more azimuth angles simultaneously.

In another further aspect, the dimensions of an illumination field stop projected on wafer plane are adjusted to optimize the resulting measurement accuracy and speed based on the nature of target under measurement.

In another further aspect, the dimensions of illumination field stop are adjusted to achieve the desired spectral resolution for each measurement application.

In some examples, e.g., if the sample is a very thick film or grating structure, the illumination field stop projected on wafer plane in the direction perpendicular to the plane of incidence is adjusted to reduce the field size to achieve increase spectral resolution. In some examples, e.g., if the sample is a thin film, the illumination field stop projected on wafer plane in the direction perpendicular to the plane of incidence is adjusted to increase the field size to achieve a shortened measurement time without losing spectral resolution.

In some embodiments, computing system 130 is configured to receive signals (e.g., signals 135, 136, 137, or any combination thereof) indicative of the spectral response of the measured structure(s). Computing system 130 is further configured to determine control signals that are communicated to a programmable illumination field stop (e.g., illumination field stop 145). A programmable illumination field stop receives the control signals and adjusts the size of the illumination aperture to achieve the desired illumination field size.

In some examples, the illumination field stop is adjusted to optimize measurement accuracy and speed as described hereinbefore. In another example, the illumination field stop is adjusted to prevent image clipping by the spectrometer slit and corresponding degradation of measurement results. In this manner, the illumination field size is adjusted such that the image of the measurement target underfills the spectrometer slit. In one example, the illumination field stop is adjusted such that the projection of the polarizer slit of the illumination optics underfills the spectrometer slit of the metrology system.

As depicted in FIG. 6, a single LSP source having multiple ports provides illumination light for SE, SR and FTIR measurements. In another embodiment, separate illumination sources are employed to provide illumination light to SE, SR and FTIR measurement channels.

As depicted in FIG. 6, the SE, SR and FTIR measurement channels have collocated focus at the wafer. In some other embodiments, the SE, SR and FTIR measurement channels are not collocated at the wafer.

Figure 14:
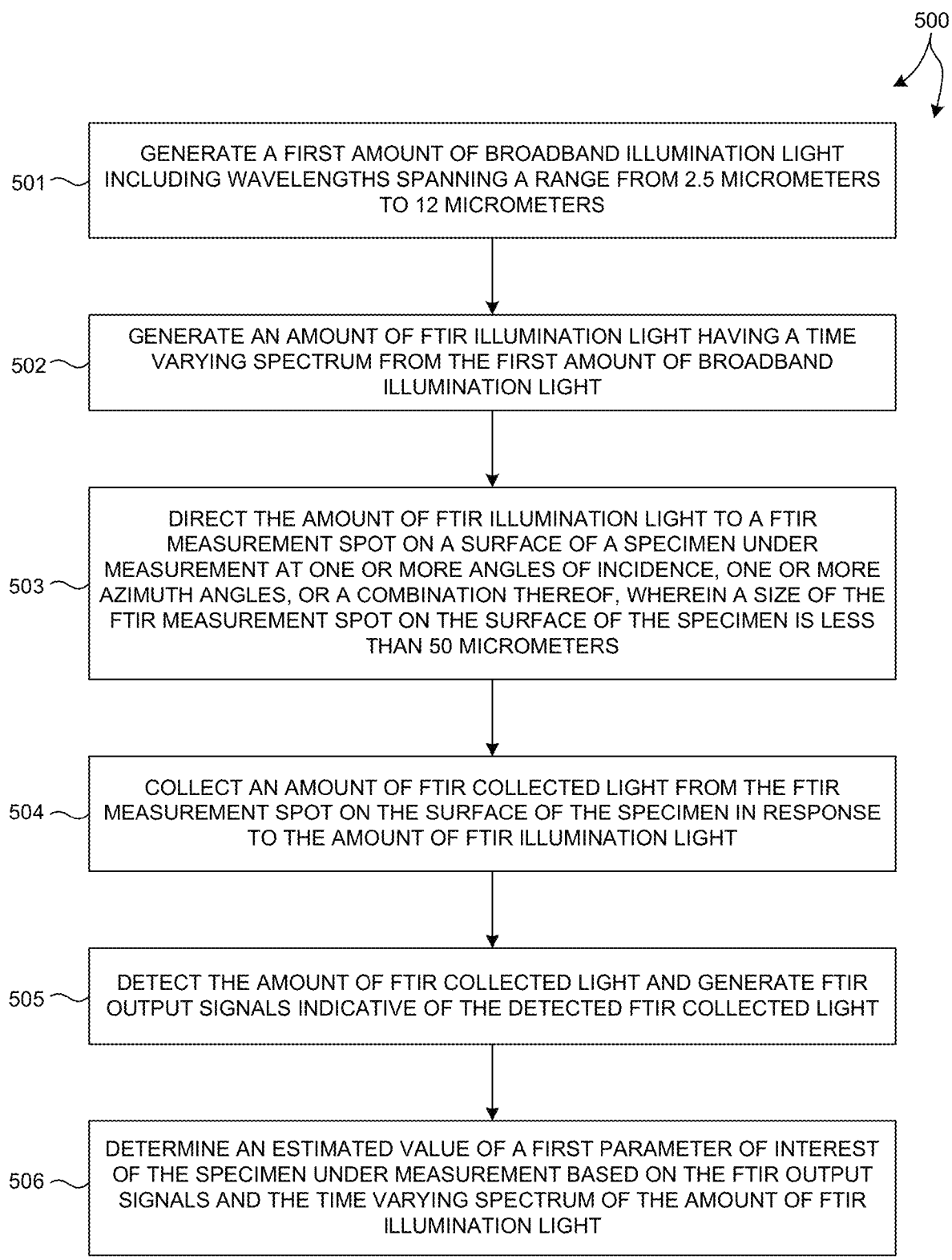
FIG. 14 illustrates a method 500 of performing mid-infrared FTIR spectroscopic measurements of one or more structures as described herein.

FIG. 14 illustrates a method 500 of performing spectroscopic measurements in at least one novel aspect. Method 500 is suitable for implementation by a metrology system such as metrology systems 100, 200, and 300 illustrated in FIGS. 6, 9, and 10, respectively, of the present invention. In one aspect, it is recognized that data processing blocks of method 500 may be carried out via a pre-programmed algorithm executed by one or more processors of computing system 130, or any other general purpose computing system. It is recognized herein that the particular structural aspects of metrology systems 100, 200, and 300 do not represent limitations and should be interpreted as illustrative only.

In block 501, a first amount of broadband illumination light including wavelengths spanning a range from 2.5 micrometers to 12 micrometers is generated by one or more illumination sources.

In block 502, an amount of FTIR illumination light having a time varying spectrum is generated from the first amount of broadband illumination light.

In block 503, the amount of FTIR illumination light is directed to a FTIR measurement spot on a surface of a specimen under measurement at one or more angles of incidence, one or more azimuth angles, or a combination thereof. The size of the FTIR measurement spot on the surface of the specimen is less than 50 micrometers.

In block 504, an amount of FTIR collected light is collected from the FTIR measurement spot on the surface of the specimen in response to the amount of FTIR illumination light.

In block 505, the amount of FTIR collected light is detected and FTIR output signals indicative of the detected FTIR collected light are generated.

In block 506, an estimated value of a first parameter of interest of the specimen under measurement is determined based on the FTIR output signals and the time varying spectrum of the amount of FTIR illumination light.

In a further embodiment, systems 100, 200, and 300 include one or more computing systems 130 employed to perform measurements of actual device structures based on spectroscopic measurement data collected in accordance with the methods described herein. The one or more computing systems 130 may be communicatively coupled to the spectrometer. In one aspect, the one or more computing systems 130 are configured to receive measurement data associated with measurements of the structure of the specimen under measurement.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to the spectrometers in any manner known in the art. For example, the one or more computing systems 130 may be coupled to computing systems associated with the spectrometers. In another example, the spectrometers may be controlled directly by a single computer system coupled to computer system 130.

The computer system 130 of metrology system 100 may be configured to receive and/or acquire data or information from the subsystems of the system (e.g., spectrometers and the like) by a transmission medium that may include wireline and/or wireless portions. In this manner, the transmission medium may serve as a data link between the computer system 130 and other subsystems of system 100.

Computer system 130 of metrology system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board metrology system 100, external memory, or other external systems). For example, the computing system 130 may be configured to receive measurement data from a storage medium (i.e., memory 132 or an external memory) via a data link. For instance, spectral results obtained using the spectrometers described herein may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, a measurement model or an estimated parameter value 171 determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some examples, the measurement models are implemented as an element of a SpectraShape® optical critical-dimension metrology system available from KLA-Tencor Corporation, Milpitas, Calif., USA. In this manner, the model is created and ready for use immediately after the spectra are collected by the system.

In some other examples, the measurement models are implemented off-line, for example, by a computing system implementing AcuShape® software available from KLA-Tencor Corporation, Milpitas, Calif., USA. The resulting, trained model may be incorporated as an element of an AcuShape® library that is accessible by a metrology system performing measurements.

Figure 13:
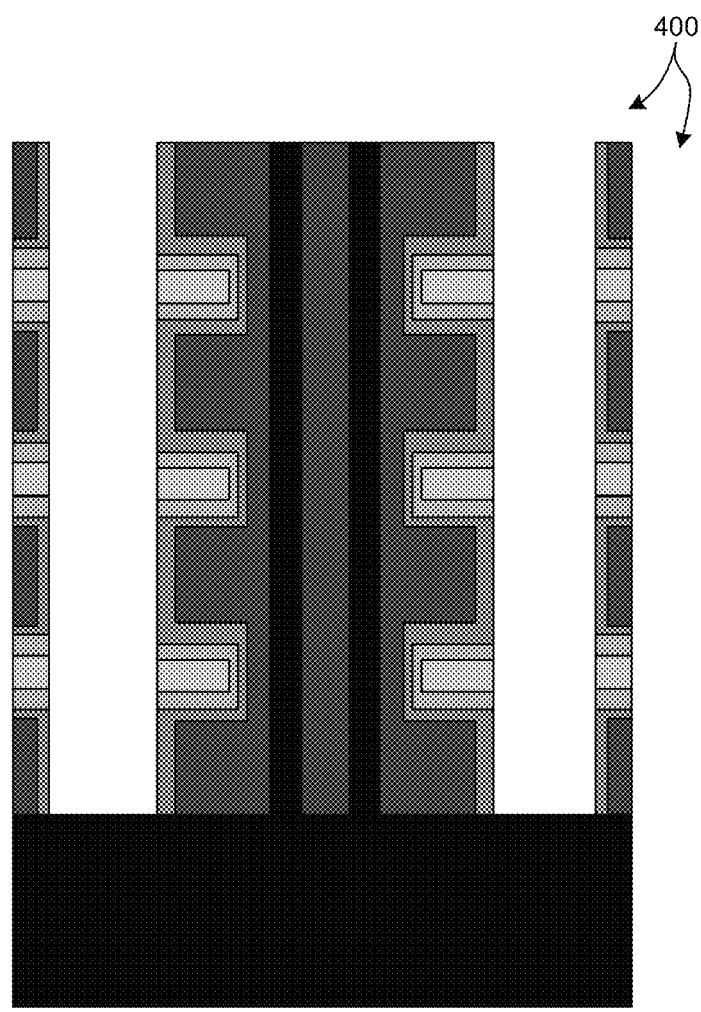
FIG. 13 depicts an exemplary high aspect ratio NAND structure 400 that suffers from low light penetration into the structure(s) being measured.

In another aspect, the methods and systems for spectroscopic metrology of semiconductor devices described herein are applied to the measurement of high aspect ratio (HAR) structures, large lateral dimension structures, or both. The described embodiments enable optical critical dimension (CD), film, and composition metrology for semiconductor devices including three dimensional NAND structures, such as vertical-NAND (V-NAND) structures, dynamic random access memory structures (DRAM), etc., manufactured by various semiconductor manufacturers such as Samsung Inc. (South Korea), SK Hynix Inc. (South Korea), Toshiba Corporation (Japan), and Micron Technology, Inc. (United States), etc. These complex devices suffer from low light penetration into the structure(s) being measured. FIG. 13 depicts an exemplary high aspect ratio NAND structure 400 that suffers from low light penetration into the structure(s) being measured. A spectroscopic ellipsometer with broad-band capability and wide ranges of AOI, azimuth angle, or both, having simultaneous spectral band detection as described herein is suitable for measurements of these high-aspect ratio structures. HAR structures often include hard mask layers to facilitate etch processes for HARs. As described herein, the term "HAR structure" refers to any structure characterized by an aspect ratio that exceeds 2:1 or 10:1, and may be as high as 100:1, or higher.

In yet another aspect, the measurement results described herein can be used to provide active feedback to a process tool (e.g., lithography tool, etch tool, deposition tool, etc.). For example, values of measured parameters determined based on measurement methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values and a trained measurement model may be communicated to a lithography tool, etch tool, or deposition tool.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous SiO2. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A metrology system comprising:
    a mid-infrared Fourier Transform Infrared (FTIR) spectrometer including:
        at least one illumination source generating a first amount of broadband illumination light including wavelengths spanning a range from 2.5 micrometers to 12 micrometers;
        an interferometer receiving the first amount of broadband illumination light and generating an amount of FTIR illumination light having a time varying spectrum;
        an FTIR illumination optics subsystem directing the amount of FTIR illumination light from the interferometer to a FTIR measurement spot on a surface of a specimen under measurement at one or more angles of incidence, one or more azimuth angles, or a combination thereof, wherein a size of the FTIR measurement spot on the surface of the specimen is less than 50 micrometers;
        a FTIR collection optics subsystem collecting an amount of FTIR collected light from the FTIR measurement spot on the surface of the specimen in response to the amount of FTIR illumination light;
        at least one FTIR detector having a surface sensitive to incident light, the at least one FTIR detector detecting the amount of FTIR collected light and generating FTIR output signals indicative of the detected FTIR collected light; and
    a computing system configured to generate an estimated value of a first parameter of interest of the specimen under measurement based on the FTIR output signals and the time varying spectrum of the amount of FTIR illumination light.

2. The metrology system of claim 1, the at least one illumination source generating illumination light spanning a wavelength range from 2 micrometers to 20 micrometers.

3. The metrology system of claim 1, wherein the mid-infrared FTIR spectrometer includes a polarizing element in an optical path between the at least one illumination source and the speciment under measurement, a polarizing element in an optical path between the specimen under measurement and the FTIR detector, or both.

4. The metrology system of claim 1, wherein the at least one illumination source includes a laser sustained plasma (LSP) light source generating the first amount of broadband illumination light.

5. The metrology system of claim 1, wherein the at least one illumination source includes an infrared supercontinuum laser source generating the first amount of broadband illumination light.

6. The metrology system of claim 1, wherein the at least one illumination source includes a set of quantum cascade laser sources generating the first amount of broadband illumination light.

7. The metrology system of claim 1, wherein the at least one illumination source includes a thermal illumination source or a globar illumination source generating the first amount of broadband illumination light.

8. The metrology system of claim 1, the mid-infrared FTIR spectrometer including a reflective objective focusing the amount of FTIR illumination light onto the FTIR measurement spot and collecting the amount of FTIR collected light from the FTIR measurement spot, wherein the amount of FTIR illumination light covers a first portion of a pupil of the reflective objective and the amount of FTIR collected light covers a second portion of the pupil of the reflective objective that is spatially separate from the first portion.

9. The metrology system of claim 1, wherein the one or more angles of incidence does not include a normal angle of incidence.

10. The metrology system of claim 1, wherein the one or more angles of incidence are within a range of angles of incidence from 5 degrees to 40 degrees.

11. The metrology system of claim 1, wherein the at least one FTIR detector is cooled by a Stirling cooler.

12. The metrology system of claim 1, further comprising:
    a second metrology subsystem including:
        an illumination optics subsystem directing an amount of illumination light from the at least one illumination source to a measurement spot on the surface of the specimen under measurement at one or more angles of incidence, one or more azimuth angles, or a combination thereof;
        a collection optics subsystem collecting an amount of collected light from the measurement spot on the surface of the specimen in response to the amount of illumination light;

at least one detector having a surface sensitive to incident light, the at least one detector detecting the amount of collected light and generating output signals indicative of the detected collected light, wherein the computing system is further configured to generate an estimated value of a second parameter of interest of the specimen under measurement based on the output signals.

13. The metrology system of claim 12, wherein the first and second parameters of interest are the same parameter of interest.

14. The metrology system of claim 12, wherein the amount of illumination light includes wavelengths different from the amount of FTIR illumination light.

15. The metrology system of claim 12, wherein the FTIR measurement spot and the measurement spot are colocated.

16. The metrology system of claim 12, wherein the detecting of the amount of collected light and the detecting of the amount of FTIR collected light occurs simultaneously.

17. The metrology system of claim 12, wherein an optical path of the mid-infrared FTIR spectrometer and an optical path of the second metrology subsystem include a reflective objective.

18. The metrology system of claim 12, wherein the second metrology subsystem is any of a spectroscopic ellipsometer, a spectroscopic reflectometer, a scatterometer, an X-ray based metrology subsystem, or a hyperspectral imaging based metrology system.

19. A method comprising:
generating a first amount of broadband illumination light including wavelengths spanning a range from 2.5 micrometers to 12 micrometers;
generating an amount of FTIR illumination light having a time varying spectrum from the first amount of broadband illumination light;
directing the amount of FTIR illumination light to a FTIR measurement spot on a surface of a specimen under measurement at one or more angles of incidence, one or more azimuth angles, or a combination thereof, wherein a size of the FTIR measurement spot on the surface of the specimen is less than 50 micrometers;
collecting an amount of FTIR collected light from the FTIR measurement spot on the surface of the specimen in response to the amount of FTIR illumination light;
detecting the amount of FTIR collected light and generating FTIR output signals indicative of the detected FTIR collected light; and
determining an estimated value of a first parameter of interest of the specimen under measurement based on the FTIR output signals and the time varying spectrum of the amount of FTIR illumination light.

20. The method of claim 19, wherein the at least one illumination source includes a laser sustained plasma (LSP) light source generating the first amount of broadband illumination light.

21. The method of claim 19, wherein the one or more angles of incidence does not include a normal angle of incidence.

22. The method of claim 19, further comprising:
polarizing the amount of FTIR illumination light, the amount of FTIR collected light, or both.

23. The method of claim 19, wherein the specimen under measurement includes a three dimensional NAND structure or a dynamic random access memory structure.

24. The method of claim 19, further comprising:
directing an amount of illumination light from the at least one illumination source to a measurement spot on the surface of the specimen under measurement at one or more angles of incidence, one or more azimuth angles, or a combination thereof;
collecting an amount of collected light from the measurement spot on the surface of the specimen in response to the amount of illumination light;
detecting the amount of collected light and generating output signals indicative of the detected collected light; and
determining an estimated value of a second parameter of interest of the specimen under measurement based on the output signals.

25. The method of claim 24, wherein the first and second parameters of interest are the same parameter of interest.

26. The method of claim 24, wherein the amount of illumination light includes wavelengths different from the amount of FTIR illumination light.

27. The method of claim 24, wherein the FTIR measurement spot and the measurement spot are colocated.

28. The method of claim 24, wherein the detecting of the amount of collected light and the detecting of the amount of FTIR collected light occurs simultaneously.

29. A metrology system comprising:
a mid-infrared Fourier Transform Infrared (FTIR) spectrometer including:
one or more illumination sources including a laser sustained plasma (LSP) light source generating a first amount of broadband illumination light including wavelengths spanning a range from 2.5 micrometers to 12 micrometers;
an interferometer receiving the first amount of broadband illumination light and generating an amount of FTIR illumination light having a time varying spectrum;
an FTIR illumination optics subsystem directing the amount of FTIR illumination light from the interferometer to a FTIR measurement spot on a surface of a specimen under measurement at one or more angles of incidence, one or more azimuth angles, or a combination thereof, wherein a size of the FTIR measurement spot on the surface of the specimen is less than 50 micrometers;
a FTIR collection optics subsystem collecting an amount of FTIR collected light from the FTIR measurement spot on the surface of the specimen in response to the amount of FTIR illumination light;
at least one FTIR detector having a surface sensitive to incident light, the at least one FTIR detector detecting the amount of FTIR collected light and generating FTIR output signals indicative of the detected FTIR collected light; and
a computing system configured to generate an estimated value of a first parameter of interest of the specimen under measurement based on the FTIR output signals and the time varying spectrum of the amount of FTIR illumination light.

30. The metrology system of claim 29, wherein the one or more angles of incidence does not include a normal angle of incidence.

31. The metrology system of claim 29, wherein a measurement channel of the mid-infrared FTIR spectrometer includes a polarizing element in an illumination path, a collection path, or both, of the mid-infrared FTIR spectrometer.

32. The metrology system of claim 29, further comprising:
a second metrology subsystem including:

an illumination optics subsystem directing an amount of illumination light from the one or more illumination sources to a measurement spot on the surface of the specimen under measurement at one or more angles of incidence, one or more azimuth angles, or a combination thereof;

a collection optics subsystem collecting an amount of collected light from the measurement spot on the surface of the specimen in response to the amount of illumination light;

at least one detector having a surface sensitive to incident light, the at least one detector detecting the amount of collected light and generating output signals indicative of the detected collected light, wherein the computing system is further configured to generate an estimated value of a second parameter of interest of the specimen under measurement based on the output signals.

33. The metrology system of claim 32, wherein the amount of illumination light is generated by the LSP light source.

34. The metrology system of claim 32, wherein the first and second parameters of interest are the same parameter of interest.

35. The metrology system of claim 32, wherein the amount of illumination light includes wavelengths different from the amount of FTIR illumination light.

36. The metrology system of claim 32, wherein the FTIR measurement spot and the measurement spot are colocated.

37. The metrology system of claim 32, wherein the detecting of the amount of collected light and the detecting of the amount of FTIR collected light occur simultaneously.

* * * * *